(12) United States Patent
Waers

(10) Patent No.: US 6,276,218 B1
(45) Date of Patent: Aug. 21, 2001

(54) ANALOG SIGNAL PROCESSING METHOD FOR VORTEX DETECTOR

(75) Inventor: John F. Waers, Longmont, CO (US)

(73) Assignee: Engineering Measurements Company, Longmont, CO (US)

( * ) Notice: Subject to any disclaimer, the term of this patent is extended or adjusted under 35 U.S.C. 154(b) by 0 days.

(21) Appl. No.: 09/349,681

(22) Filed: Jul. 8, 1999

Related U.S. Application Data

(62) Division of application No. 08/680,465, filed on Jul. 15, 1996.

(51) Int. Cl.$^7$ .................................................. G01F 1/58
(52) U.S. Cl. ........................................................ 73/861.22
(58) Field of Search ........................... 73/861.22, 861.18, 73/861.23, 195

(56) References Cited

U.S. PATENT DOCUMENTS

| | | | |
|---|---|---|---|
| 3,116,639 | 1/1964 | Bird | 73/194 |
| 4,074,571 | 2/1978 | Burgess | 73/194 |
| 4,258,565 | 3/1981 | Sawayama et al. | 73/141 |
| 4,334,426 * | 6/1982 | Kita et al. | 73/118 |
| 4,432,241 | 2/1984 | Kita | 73/861.22 |
| 4,445,388 | 5/1984 | Herzl et al. | 73/861.24 |
| 4,455,877 | 6/1984 | Blechinger et al. | 73/861.22 |
| 4,520,678 | 6/1985 | Koziol et al. | 73/861.24 |
| 4,627,295 | 12/1986 | Matsubara et al. | 73/861.24 |
| 4,699,012 | 10/1987 | Lew et al. | 73/861.24 |
| 4,703,659 | 11/1987 | Lew et al. | 73/861.24 |
| 4,716,770 | 1/1988 | Herzog | 73/861.24 |
| 5,005,427 * | 4/1991 | Ohmae | 73/861.22 |
| 5,121,658 * | 6/1992 | Lew | 73/195 |
| 5,197,336 | 3/1993 | Tsuruoka et al. | 73/861.24 |

* cited by examiner

*Primary Examiner*—Max Noori
*Assistant Examiner*—Jewel V. Thompson
(74) *Attorney, Agent, or Firm*—James R. Young; Chrisman Bynum & Johnson

(57) ABSTRACT

A vortex detector for low flow rates comprises a vane that is located downstream from a vortex generator and is connected at only one end in a canthever manner to a cylindrical housing, which defines a flow passage. The end of the vane connected to the housing includes an area of reduced thickness that acts as a resilient, plastic hinged joint to make it easier for weak vortices generated by the vortex generator to impart vibrations or deflections to of the vane. Strain gauge transducers in the area of reduced thickness detect deflections or vibrations of the vane and produce analog electric signals having amplitudes and frequencies that are related to the strengths, frequencies, and period of the vortices. The analog signals are converted to digital signals, which are indicative of strengths, frequencies, and periods of the vortices, but only such digital signals that result from corresponding analog signals with amplitudes above a threshold value are treated as originated from vortices action on the vane for purposes of determining vortex periods. Updated average vortex frequencies, calculated from vortex periods that are within an allowable deviation range, are used to determine instantaneous flow rates. The instantaneous flow rates are then processed through a smoothing function to stabilize flow rate outputs and displays.

10 Claims, 17 Drawing Sheets

ANALOG SIGNAL PROCESSING METHOD FOR VORTEX DETECTOR

CROSS-REFERENCE TO RELATED APPLICATION

This patent application is a division of co-pending U.S. patent application Ser. No. 08/680,465, filed Jul. 15, 1996, entitled "improved Vortex Detector and Flow Meter", incorporated herein by this reference in its entirety.

BACKGROUND OF THE INVENTION

1. Field of the Invention

This invention relates in general to flow meters and, more particularly, to a vortex detector with enhanced sensitivity and signal processing for sensing and measuring vortex frequencies at very low flow rates.

2. Description of the Prior Art

Vortex shedding flow meters have been used for many years for a wide variety of applications and have proven to be quite popular because of their ability to measure the flow rates of a wide range of fluids accurately and reliably, including steam, liquids, and gases. A vortex shedding flow meter operates on the principle that a bluff body, when placed in a moving fluid, produces an alternating series of vortices, called a vortex street, at a frequency that is directly related to the velocity of the moving fluid. The amplitude of the each vortex is proportional to the square of the frequency of the vortex street. Some vortex shedding flow meters detect the frequency of the shed vortices, thus the flow rate, by having a vane positioned downstream from the bluff body. As the vortices in the vortex street pass over the vane, alternating lateral forces deflect the vane one way and then the other in much the same way that a flag furls in the wind in response to the vortices shed from the flag pole. The deflections of the vane can be detected and measured. The strengths of the vortices in the vortex street are related to the density of the fluid and its velocity. Therefore, high density, high velocity fluids produce strong vortices, while the vortices produced in low density, low velocity fluids are relatively weak.

One of the primary advantages of vortex shedding flow meters is that they have no moving parts, other than the flexure of the vane, bluff body, or other structure used as the transducer, and their inherent ruggedness makes them ideally suited for applications that involve extreme temperatures and pressures. However, one of the most serious disadvantages of vortex shedding flow meters is their inability to detect vortices in gases or other low density fluids very accurately as well as their inability to detect and measure vortices in fluids flowing at very low flow rates accurately. It has been very difficult, if not practically impossible, to detect in an accurate and dependable manner the very small vane deflections that result from the weak vortices produced in low speed flows of low density fluids, including liquids such as water.

Another disadvantage associated with currently available vortex shedding flow meters is that their signal to noise ratios are relatively low. Since transducers are typically used to detect the mechanical reaction of the vane to the passing vortices in the vortex street, they also pick up the other mechanical movements of the vane as well as vibrations and other noise in the fluid and in the pipe in which the flow meters are mounted, which can include the structural vibrations of pipe lines, low frequency acoustical noises penetrating the pipe wall, noises associated with flow fluctuations unrelated to the vortex street, and the like. The adverse effect of a low signal to noise ratio becomes particularly serious when trying to measure low speed flows of fluids, especially low density fluids, since the vortices themselves are quite weak. Therefore, the correspondingly wealk signals produced by the vane deflection transducers may be lost or undetectable in the background noise.

One solution to the vortex detection problem associated with low density fluids has been to use ultrasound to detect the frequency of the vortices in the vortex street. Unfortunately, however, such ultrasonic vortex detection is not without its own drawbacks, including the errors introduced by bubbles and particles suspended in the fluid, as well as a general lack of ruggedness and durability, which makes them undesirable for use in high temperature, high pressure flow conditions.

The patent issued to Lew el al., U.S. Pat. No. 4,699,012, solves some of the shortcomings of the prior art vortex shedding flow meters by teaching the use of piezo-electric transducers to measure the deflection of the vane. Lew also achieves an improvement in the signal to noise ratio by mounting the vane on a thin diaphragm-like structure to increase the magnitude of the vane deflection, thus also increasing the magnitude of the output signal from the transducers. While Lew's vortex mieter does achieve an improvement in signal to noise ratio over the prior art, additional improvements to signal to noise ratio would further enhance the usefulness of vortex shedding flow meters, particularly in the measurement of low velocity and low density fluids.

SUMMARY OF THE INVENTION

Accordingly, it is a general object of this invention to provide a vortex detector that has an improved signal to noise ratio.

Another object of this invention is to provide a vortex detector of high sensitivity and high accuracy.

A further object of this invention is to provide a more sensitive vortex detector for use in flow meters to enable the capability of measuring flow velocities of fluids having a wide range of densities, including lower densities.

Still another object is to provide a vortex detector of simple and rugged construction that is easy to manufacture and provides dependable and consistent performance.

A more specific object of this invention is to provide a more sensitive vortex detector that is capable of measuring low speed flows of fluids and flows of low density fluids.

Another specific object of this invention is to provide improved signal processing to enhance signal detection as well as to provide more accurate and reliable measurements.

Still another object of this invention is to provide an improved signal processing algorithm for more robust readouts that follow flow changes more rapidly and more accurately, yet do not fluctuate so much as to be impractical to use.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the improved vortex shedding flow meter according to this invention may comprise a generally cylindrical housing or body that defines a flow passage extending from an upstream end to a downstream end. A vortex generator diametrically disposed across a first cross-section of the flow passage and oriented substantially perpendicular to the central axis of the flow passage generates a vortex street of vortices in a fluid flowing in the flow passage. A vane having a relatively low modulus of elasticity extends inward into the flow passage from the housing or body such that it is substantially parallel to the vortex generator, substantially perpendicular to the central axis of the flow passage, and positioned in the vortex street. One end of the vane is attached to the housing or body via an area of reduced thickness that acts as a fulcrum so that the vane is canthevered. In the first embodiment of the present invention, the opposed end of the vane is left unattached to the housing or body. The vortices in the vortex street produce alternating forces on the vane resulting in corresponding alternating deflections of the vane. Strain gauge transducers mounted on a printed circuit card and adjacent the vane detect the deflections of the vane and produce an electrical signal having an amplitude that is related to the strengths of the passing vortices and a frequency that is substantially identical to the vortex shedding frequency. An optional inlet nozzle attached to the upstream end of the housing or body increases the flow velocity of the fluid in the flow passage, thereby increasing the sensitivity of the vortex shedding flow meter and effectively decreasing the minimum flow velocity detectable by the vortex shedding flow meter. In a second embodiment of the vortex shedding flowmeter, the end of the vane opposite the end of the vane having the area of reduced thickness is connected to the housing via a dowel or rod that is rigidly connected to the vane and extends from the end of the vane into the housing or body. A gap exists between the dowel or rod and the housing or body such that the dowel or rod is not rigidly attached to the housing or body.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE PREFERRED EMBODIMENTS

Figure 1:
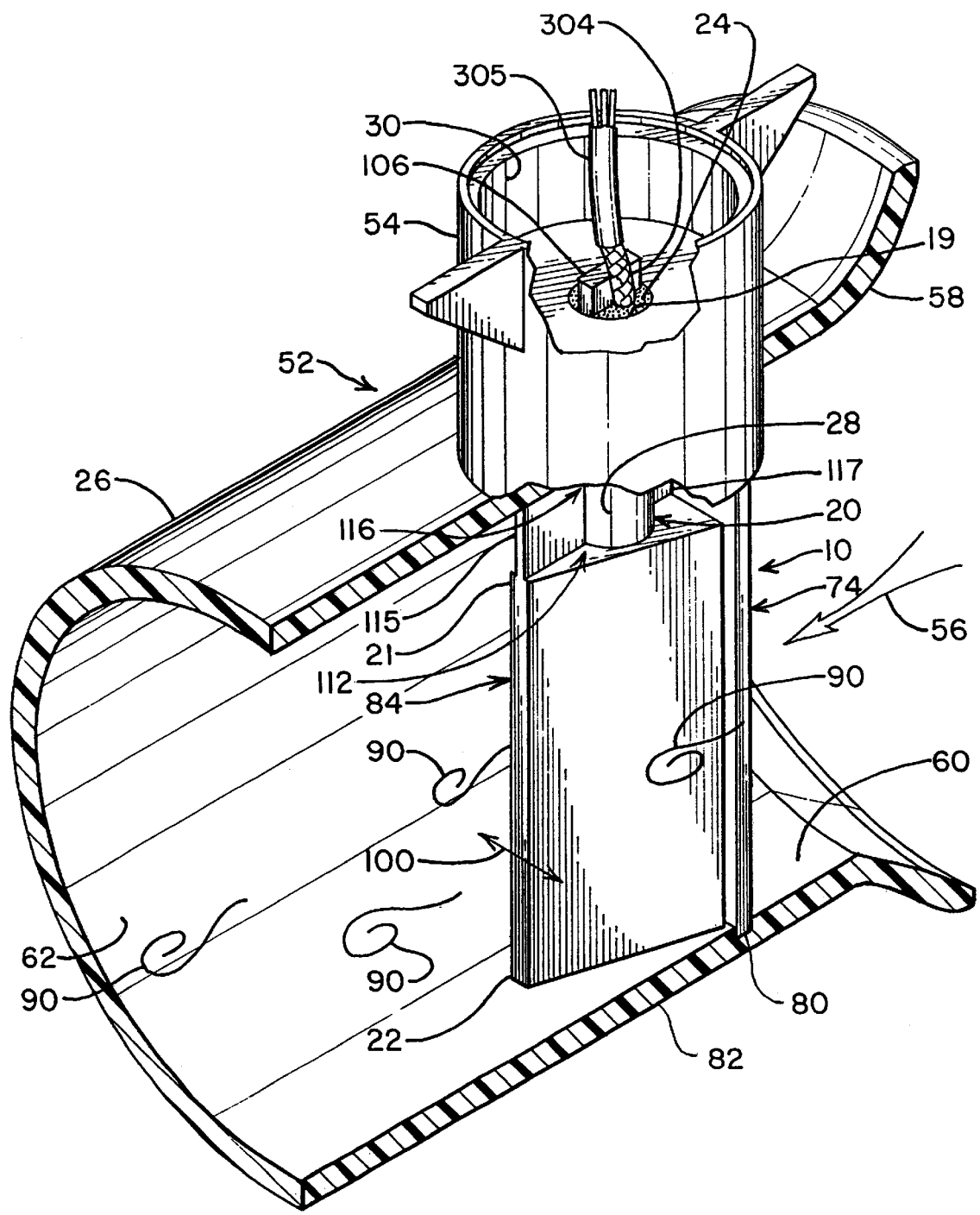
FIG. 1 is an isometric view of the vortex detector of the present invention mounted in a shroud, but with portions of the shroud and stem cut away to reveal structural details of the vortex sensor.

An improved vortex detector 10 according to this invention for use in flow meters and other applications is shown in FIG. 1 mounted in a vortex sensor assembly 52. The vortex detector 10 according to this invention essentially comprises a canthevered vane 84 positioned immediately down stream of a bluff body 74. The vane 84 is sufficiently substantial in size and of appropriate shape to be driven in transverse oscillatory motion 100 by vortices 90 that are shed in a flowing fluid 56 by the bluff body 74, as will be described in more detail below. The canthevered mounting of the valve 84 is preferably with a material that has a low modulus of elasticity in the range of about $1.0 \times 10^5$ to $5.0 \times 10^6$ p.s.i., such as, for example, a polycarbonate material, to increase responsiveness to weaker vortices that are typical of low fluid flow rates as well as of low density fluids. The canthevered mounting is also preferably made more flexible than the vane 84, such as, for example, the cantilevered mounting 20 illustrated in FIG. 1, which has less cross-sectional area than the vane 84. This reduced cross-sectional area made with the low modulus of elasticity material in the $1.0 \times 10^5$ to $5.0 \times 10^6$ p.s.i. provides a weakened or more flexible, yet resilient, i.e., elastic, area 112 in the cantilevered mounting joint 20 than the rest of the vane 84. The cantilevered mounting of the vane 84, i.e., one end—the proximal end 21—of vane 84 being fixed at mounting 20 while the other end—distal end 22—of the vane 84 being free to move, in combination with the more flexible, yet resilient, mounting joint 20, ensures that even weak vortices 90 can cause the vane 84 to move in the lateral oscillatory movement 100 as described above. Further, making the cantilevered joint 20 more flexible, yet resilient in the weakened area 112 than the rest of the vane 84 causes concentration of stress and resulting strain in the joint 20. A significant feature of this invention is to mount strain gauge or other appropriate mechanical motion to electric signal transducers (not shown in FIG. 1, but described in more detail below) directly in the cantitlevered mounting joint 20, where most, if not virtually all of the stress and resulting) strain occurs. Such strain gauge mounting in the small area of the cantilevered mounting joint 20 is best done according to this invention by mounting the strain gauges or other appropriate transducers on a printed circuit board 106 that extends from the rigid stem 54 into the interior of cantilevered mounting joint 20 where most of the strain is concentrated, as will also be described in more detail below. A potting material 24, such as epoxy, that hardens to a rigid material, is used to fix the printed circuit board 106 with the strain gauges (not shown in FIG. 1) in a unitary solid manner with the stem 54 and walls of the cantilevered mounting joint 20. This basic structure of the vortex detector 10 of this invention provides a very substantially enhanced vortex detection capability that is at least sixty times more sensitive to vortices 90 than previously available vortex detectors used in flow meters and enables vortex shedding flow meters to operate accurately and reliably in significantly lower fluid flow rates than other previously available commercial vortex shedding flow meters. For example, whereas the accepted industry standard minimum flow rate reliability is about 1 ft/sec. in liquids, such as water, the vortex detector 10 of the present invention can enable flow meters to measure water and other liquid flows accurately and reliably at lower flow rates down to about 0.2 ft/sec. The details of the structure of the vortex detector 10 of this invention along with signal processing improvements that enhance accuracy, reliability, and useability of vortex detectors, for example in vortex shedding, flow meters, are described below.

Figure 2:
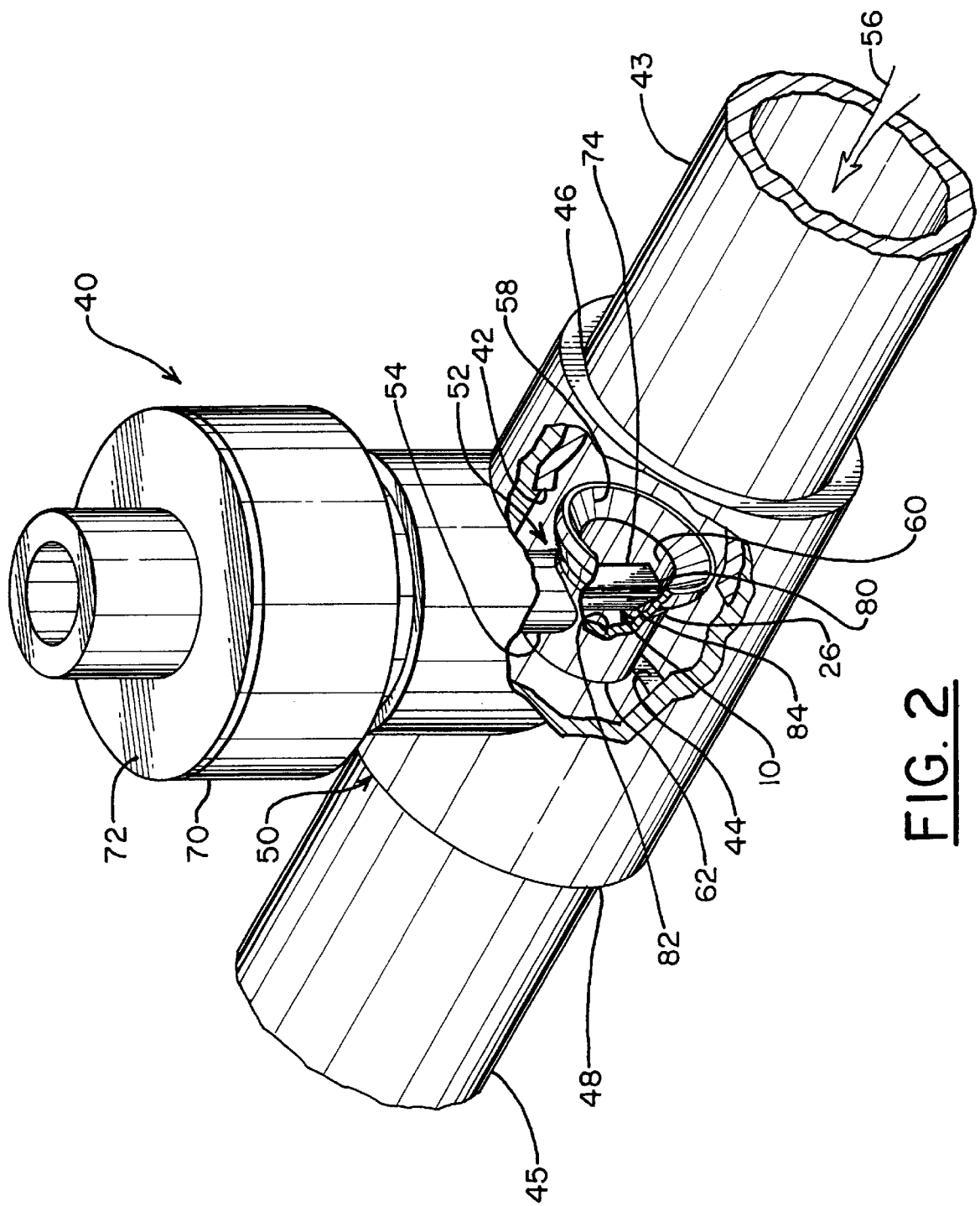
FIG. 2 is an isometric view of tile vortex detector of the present invention shown in a typical flow meter installation between two sections of pipe with a portion of the flow meter housing cut away to reveal the vortex detector.
Figure 3:
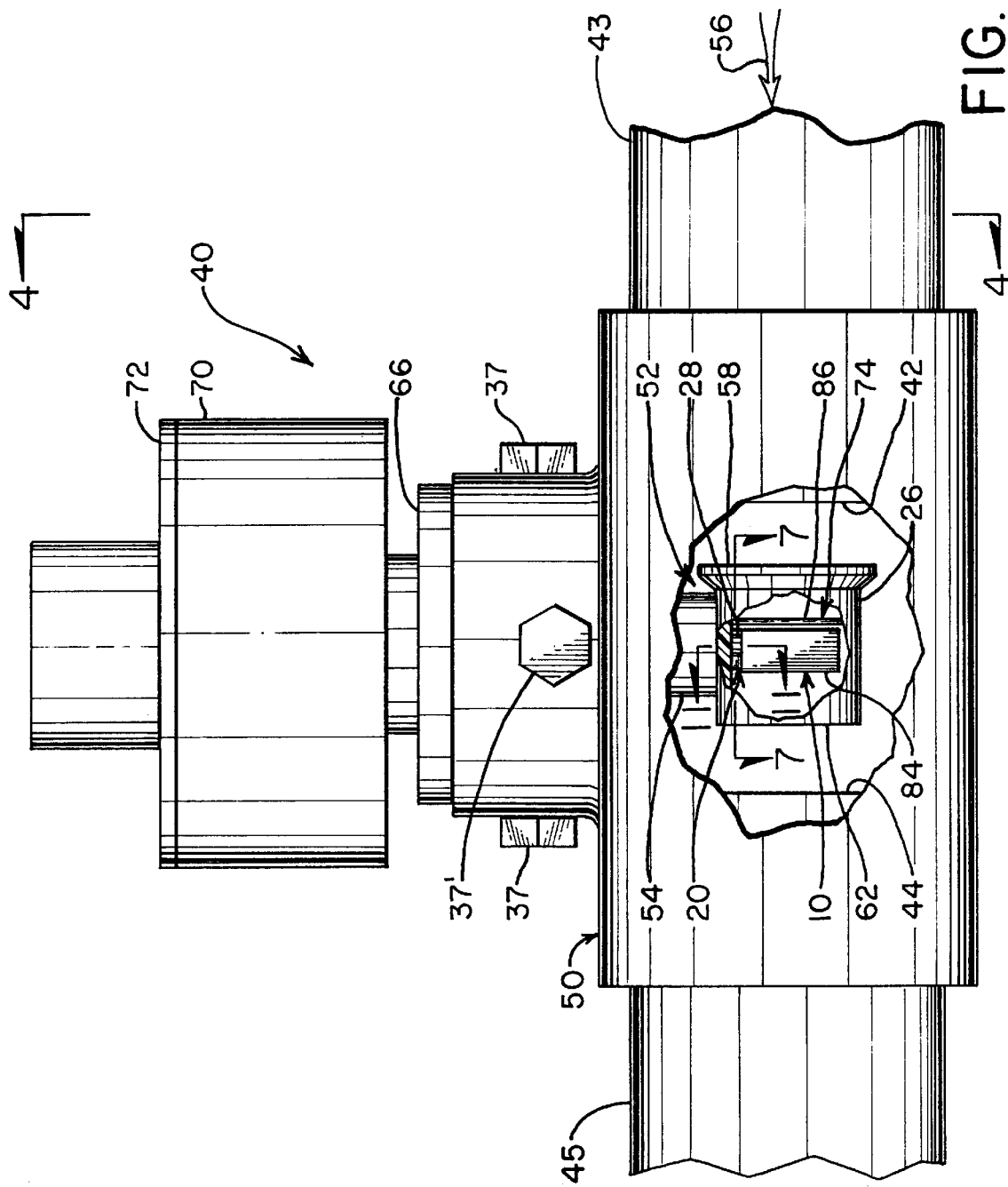
FIG. 3 is a side elevation view of the vortex shedding flow meter of FIG. 1 shown installed between two sections of pipe with a portion of the flow meter housing cut away to reveal the vortex detector.

In an exemplary vortex shedding flow meter 40 installation, such as an insertion-type flow meter application illustrated in FIGS. 2 and 3, the flow meter 40 can be inserted between two ends 42, 44 of pipe sections 43, 45, respectively. The two ends 42, 44 of the pipe sections 43, 45, respectively, are inserted into the opposite openings 46, 48, respectively, of the flow meter body 50 in such a manner, e.g., welding, threads, or adhesive, that the pipe sections 43, 45 and the flow meter body 50 form an air tight and water tight seal. The vortex sensor assembly 52 is suspended within the flow meter body 50 on the distal end of an elongated stem 54, so that a portion of the fluid 56 flowing through the pipe sections 43, 45 and flow meter body 50 passes through a shroud 26 that confines and directs that portion of the flow past the vortex detector 10. The shroud 26 is not an essential feature of the invention or of the use of the vortex detector 10 in a flow meter application, but it is helpful to derive more uniform vortex signals with less noise and interference, especially in large diameter pipe installations. The shroud 26 has an enlarged or flared inlet 58, a flow passage 60, and an exit port 62 and, when used, forms a part of the sensor assembly 52 along with the vortex detector 10 and stem 54. While the pipe sections 43, 45 and the flow meter body 50 are depicted as being metallic, it is possible for any or all of them to be plastic or some other suitable material.

Figure 4:
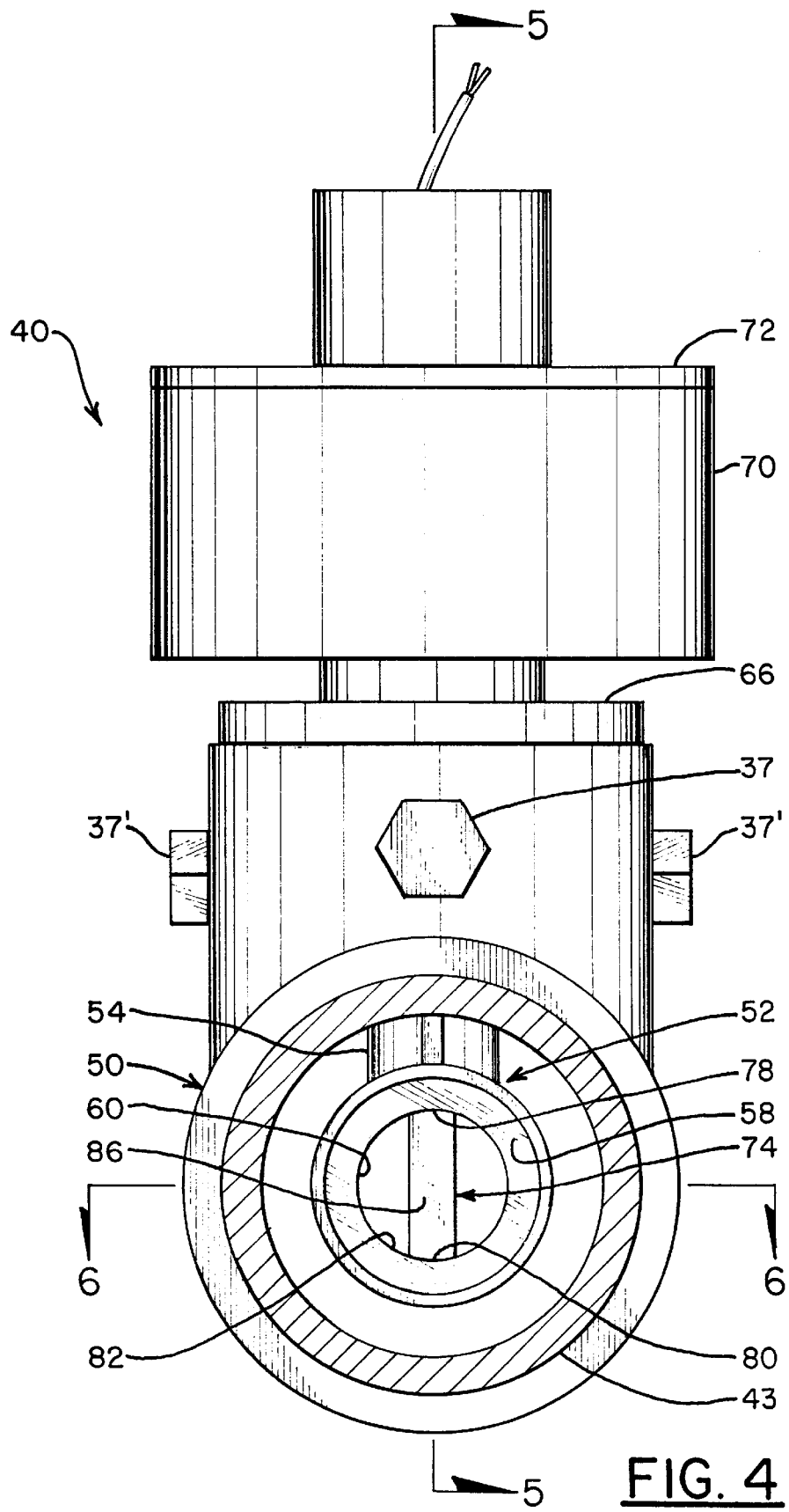
FIG. 4 is an enlarged front elevation view of the vortex detector in a cross-sectional view of one of the pipe sections taken along section line 4—4 of FIG. 3.
Figure 5:
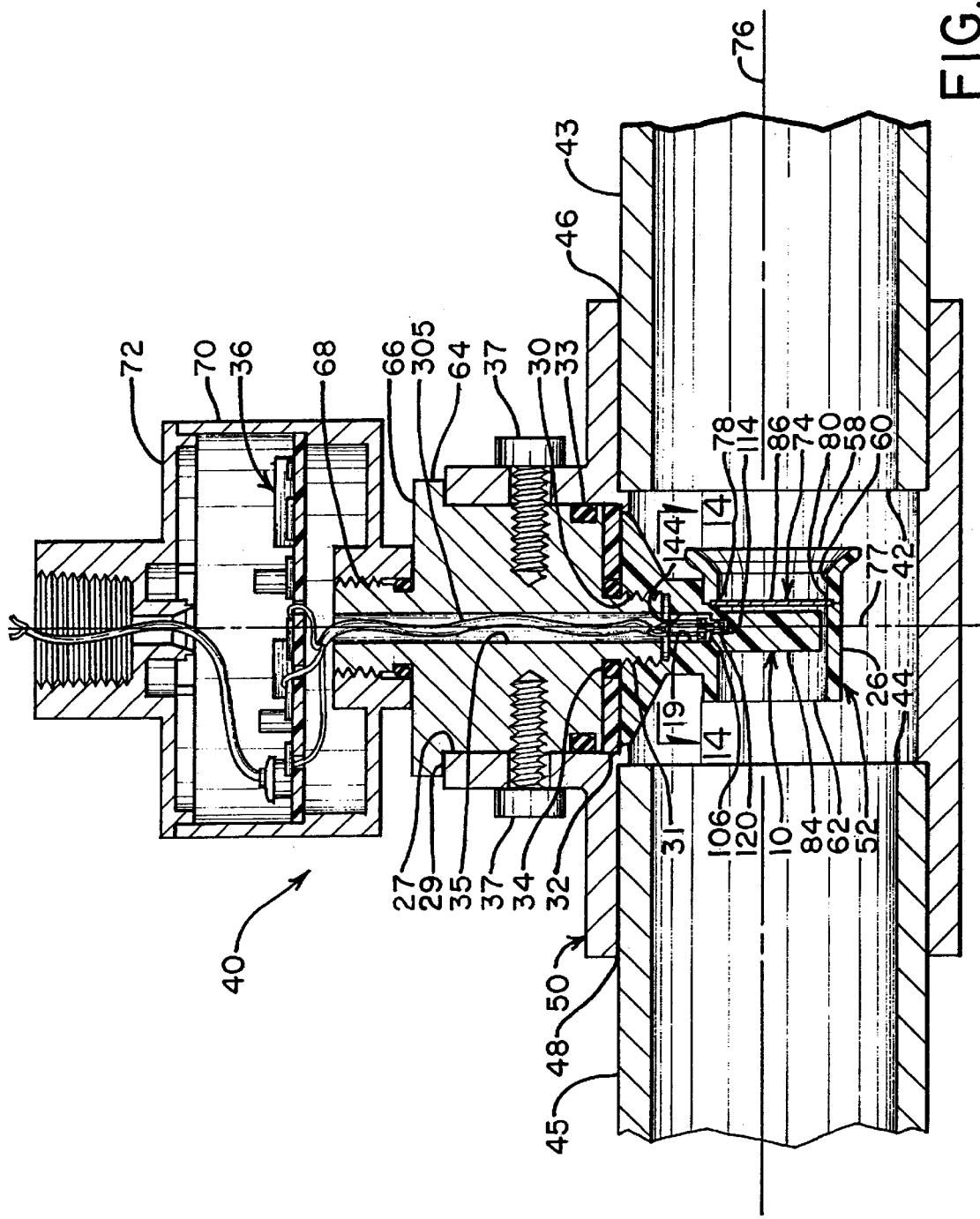
FIG. 5 is a cross-sectional view of the vortex detector in the flow meter installation taken along section line 5—5 of FIG. 4.

The stem 54 suspends the sensor assembly 52 from a stanchion 66 mounted in the top opening 27 of the flow meter body 50, as best seen in FIG. 5. A flange 64 on the stanchion 66 seats on the rim 29 around the opening 27. The stem 54 of the vortex sensor apparatus 52 has a hole 30, which receives a threaded nipple 31 that protrudes downwardly from the stanchion 66. A gasket 32 and O-ring seals 33, 34 provide seals to hold the fluid pressure in the flow meter body 50. Another threaded nipple 68 extends upwardly from the stanchion 66 to mount and support a housing 70, which houses the signal processing circuitry 36 for converting signals from the vortex sensor assembly 52 into appropriate units for a display (not shown) or other recording or processing devices (not shown). A bore 35 extends axially through the stanchion 66 to accommodate routing the electrical wires 305 from the vortex sensor assembly 52 to the circuitry 36. The housing 70 can be covered by the housing cover 72. While the mounting flange 64, the stanchion 66, the housing 70, and the housing cover 72 are depicted in FIG. 5 as being metallic, it should be noted that any or all of these components can be manufactured from other suitable materials, such as plastic, ceramics, or the like. Bolts 37 extend through the upper portion of the flow meter body 50 into the stanchion 66 to retain the assembly in position. It is preferred that some of the bolts 37, such as bolt 37' in FIGS. 3 and 4 and respective mating holes in the stanchion 66 be axially higher or lower than other bolts 37 to prevent the sensor assembly 52 from being mounted in an incorrect orientation in flow meter body 50.

Figure 6:
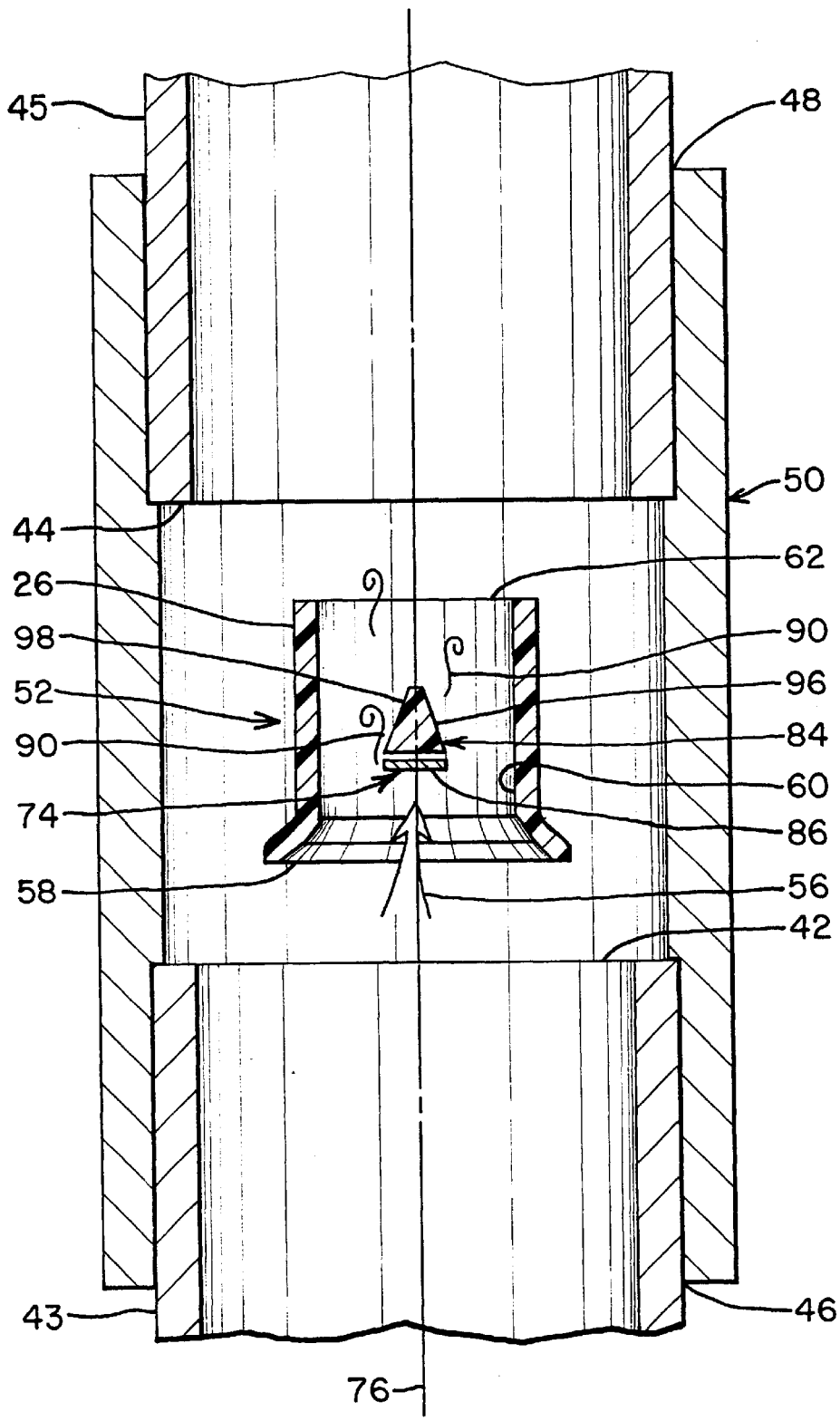
FIG. 6 is an enlarged cross-sectional view of the vortex sensor assembly taken along the section line 6—6 of FIG. 4.
Figure 7:
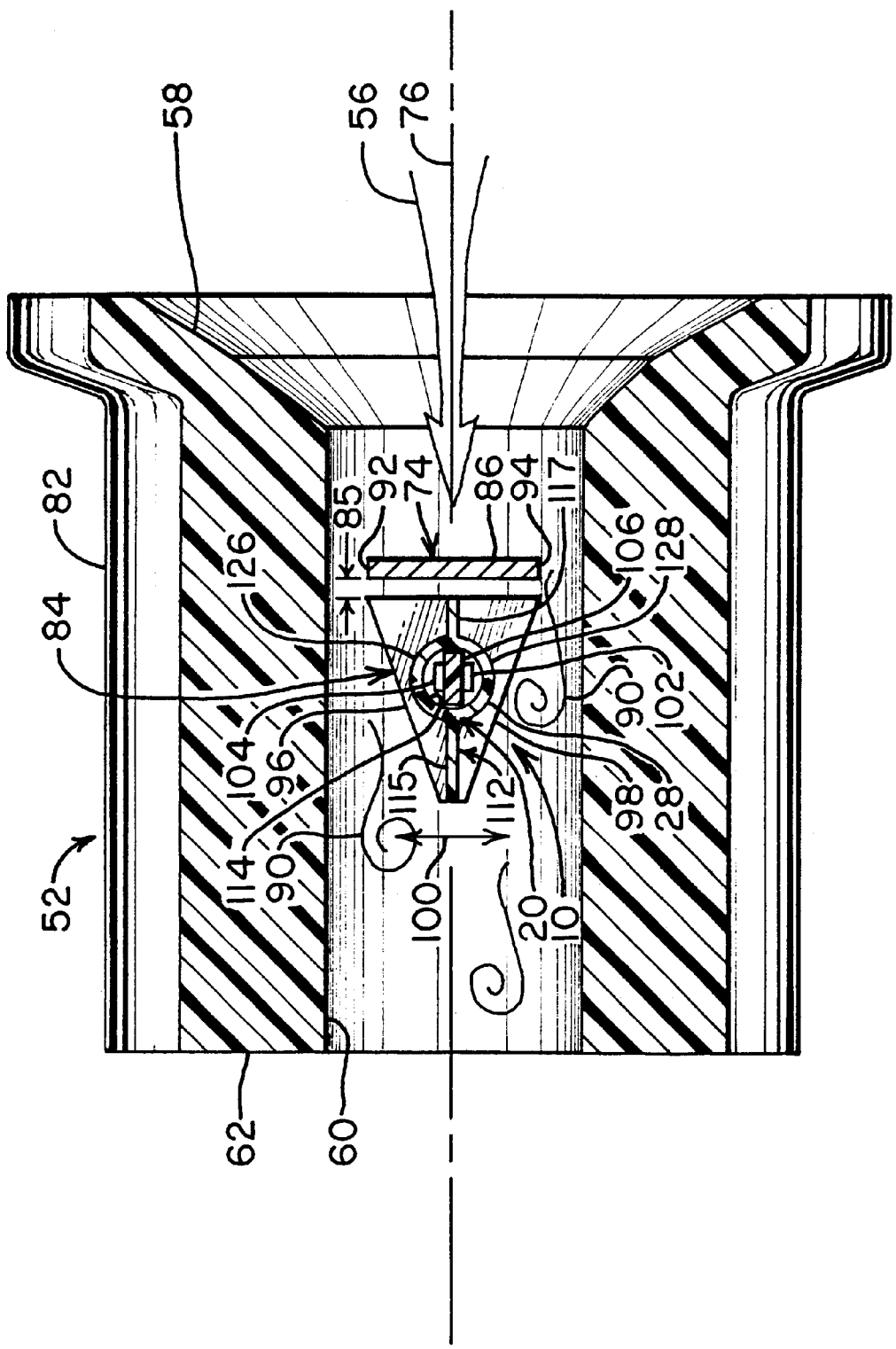
FIG. 7 is an enlarged sectional view of the vortex generating member and the vane of the vortex sensor assembly, taken along the section line 7—7 of FIG. 3.

Referring now to FIGS. 4–6, the vortex sensor assembly 52 includes a substantially rigid vortex generating member 74 that is disposed diametrically across a first cross-section of the flow passage 60 in a plane that is substantially perpendicular to the central axis 76 of the flow passage 60. However, rather than being a massive bluff body, a thin stainless steel bluff body 74 is preferred, because some flexure of the bluff body 74 enhances regularity in the vortices 90 produced in low rate flows. The two extremities 78, 80 of the vortex generator 74 are affixed to two diametrically opposite portions of the generally cylindrical housing, body, or wall 82 of shroud 26 of the vortex sensor assembly 52, as best seen in FIGS. 1 and 4. A flared inlet 58 of shroud 26 can be provided on the upstream or entry end of the flow passage 60 of shroud 26 to increase the volumetric flow rate of the fluid 56 in the flow passage 60 and to increase the amount of the fluid 56 striking the vortex generator 74. An elongated vane 84 preferably having a trapezoidal cross-section is disposed diametrically across another cross-section of the flow passage 60 parallel to, and downstream from, the vortex generator 74 such that, as best seen in FIG. 5, the longitudinal axis 77 of the vane 84 is perpendicular to and intersects the longitudinal axis 76 of the flow passage 60. The trapezoidal cross-section of the vane 84 preferably forms a symmetrical trapezoid as best seen in FIG. 7. The vane 84 can also have other cross-sectional shapes such that the cross-section of the vane 84 can be, for example, triangular, square, or rectangular. However, the trapezoidal cross-sectional shape enhances flow and formation of vortices as well as enhancing the action of vortices on the vane 84. As will be described in greater detail below, the vane 84 can be fabricated of any suitable material, but it is preferred and easiest to fabricate it of the same material as the cantilevered mounting joint 20 in a single piece, which, as discussed above, has a low modulus of elasticity to increase the sensitivity of the flow meter 40, particularly at low energy levels. The vane 84, including the cantilevered mounting joint 20, is preferably made of a material that exhibits high strength and that can withstand high temperatures, such as Ultemp® or polyethylimide.

Referring now to FIG. 7, the vortex generator 74 is preferably in the form of a thin or slender bluff body with a flat surface 86 facing the flow of fluid, which is ideally suited for producing a vortex street. The vortex generator 74 is preferably machined from a piece of stainless steel so that a collection of vortex generators 74 will have very similar, if not exact, dimensions, thereby casing calibration of the vortex gencrating flow meter 40, as will be discussed in more detail below. The vortex geieneator 74 also preferably has a generally rectangular cross-section.

A typical vortex street, as is well known in the art, comprises a sequential plurality of vortices 90 that are shed alternately from opposite sides 92, 94 of the bluff body vortex generator 74 at a frequency that is proportional to the flow velocity of the fluid 56. As the vortices 90 in the vortex street pass over the opposite surfaces 96, 98 of vane 84, the vortices 90 apply sequential pressures or forces acting on the vane 84 that tend to deflect the vane 84 back and forth in the transverse opposite directions indicated by arrow 100. The alternating deflections of the vane 84 are sensed by transducers or strain gauge transducers 102, 104 located on the printed circuit board assembly 106 (shown in FIGS. 7–13), which will be described in more detail below. The signal processing circuitry 36 (FIG. 5) for processing the signals from the strain gauge transducers 102, 104 will also be described in more detail below. The cantilevered mounting 20 in the preferred embodiment comprises an area of reduced thickness 112 in the form of a shank 28 that connects the vane 84 to the stem 54. The shank 28 forms a neck that has a reduced cross-sectional area that is less than the cross-sectional area of the vane 84 so that substantially all of the stress and resulting strain from lateral movement of vane 84 is concentrated and localized in the neck formed by shrank 28. Tle shank 28 has a hole 114 axially aligned with hole 30 and 19 in stem 54 to receive an end ofthe printed circuit board 106 that has strain gauges 102, 104 mounted thereon, as also illustrated in FIGS. 5, 7, and 11–16. The printed circuit board 106 and the strain gauges 102, 104 are potted with a hard potting material 24 in the hole 114, as best seen in FIGS. 1 and 11, so that they form a unitary mass with the shank 28 and undergo the same strains. The hole 114 and the printed Circuit board 106 are positioned on the longitudinal axis 77 of the vane 84 so that the strain gauges 102, 104 on opposite sides of the printed circuit board 106 are positioned on opposite sides of a plane that includes the central axis 76 and the axis 77 and preferably close to the walls of shank 28 in order to undergo as much of the strain in shank 28 as possible. Thin webs 115, 117, part of the area of reduced thickness 112, are also provided in the canti levered mounting joint 20 to increase central stability of the vane 84 in the direction of the longitudinal central axis 76 while hardly interfering at all with the transverse oscillatory or vibratory movement 100 of vane 84.

Figure 8:
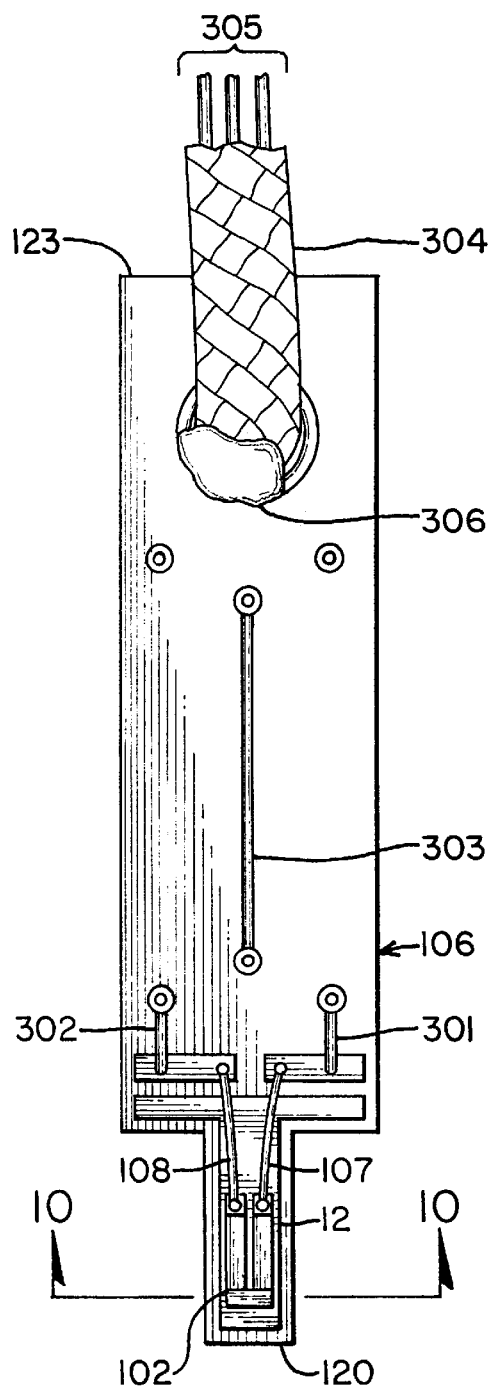
FIG. 8 is an enlarged elevation view of the printed circuit board assembly of the vortex detector of FIG. 1.
Figure 9:
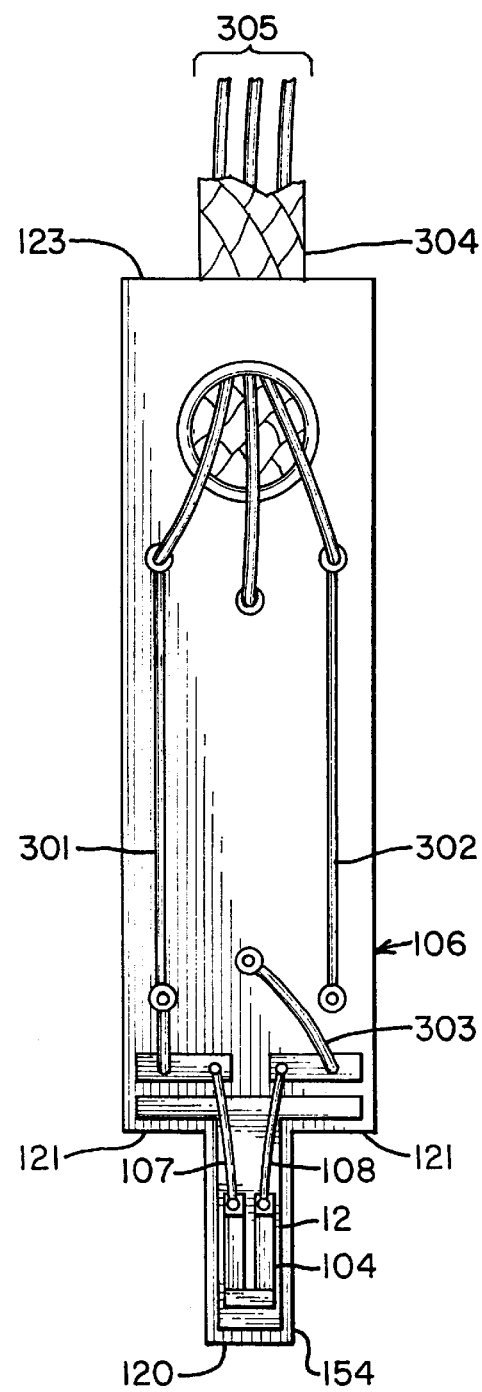
FIG. 9 is an enlarged elevation view of the opposite side of the printed circuit board assembly of FIG. 8.
Figure 10:
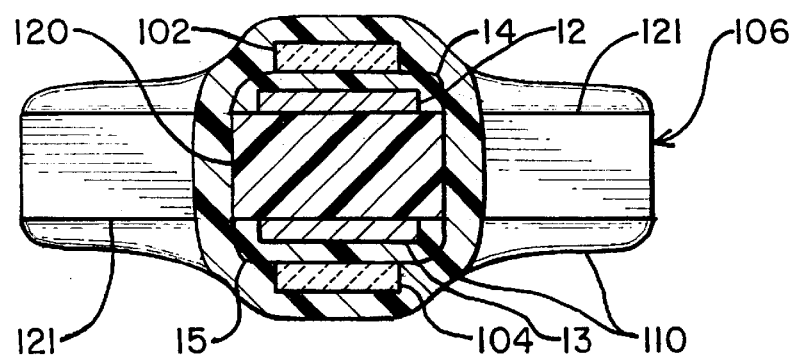
FIG. 10 is an enlarged cross-sectional view of the printed circuit board assembly taken along the section line 10—10 of FIG. 8.
Figure 11:
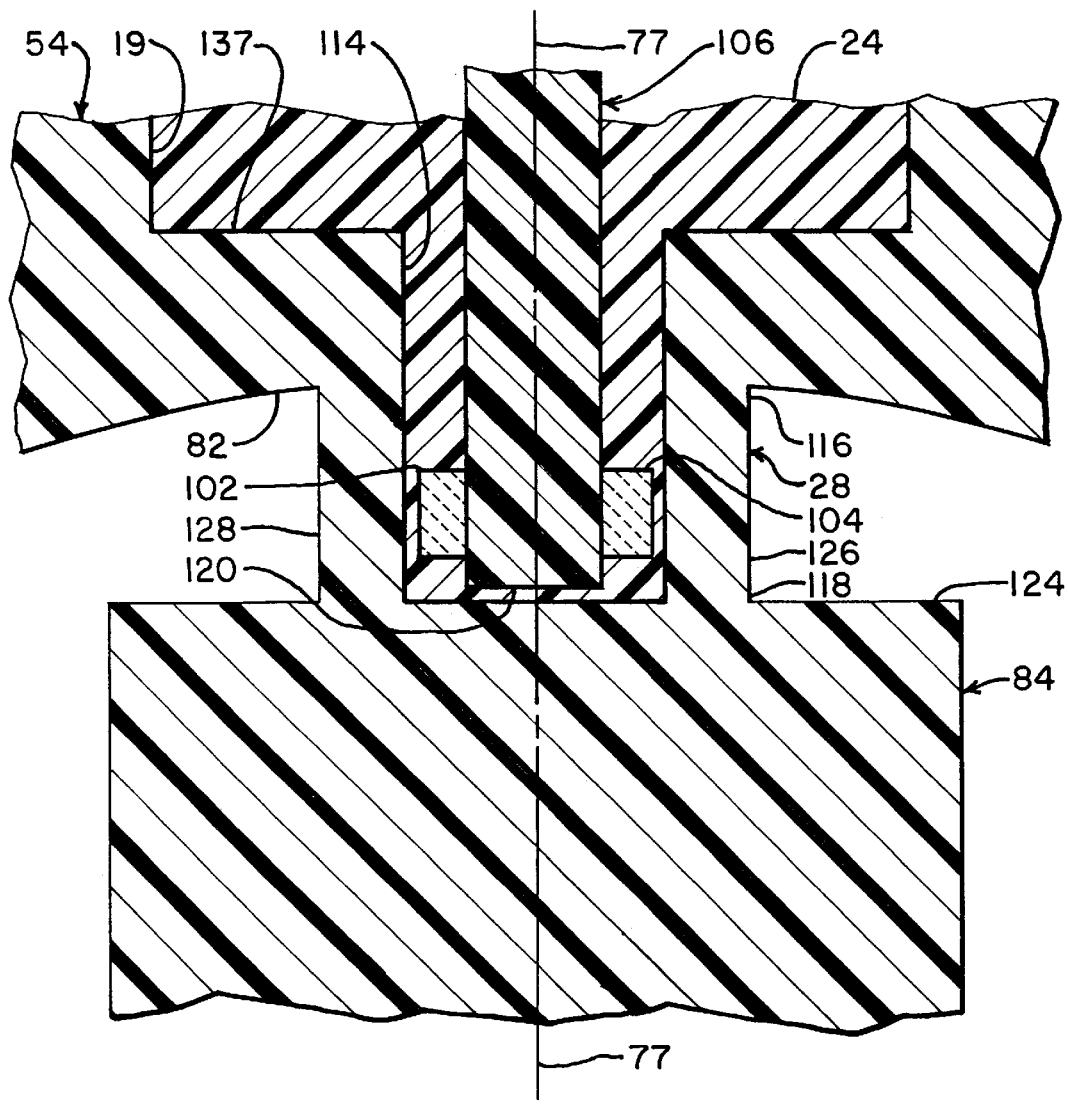
FIG. 11 is an enlarged sectional view of the area of reduced thickness of the vane taken along the line 11—11 of FIG. 3, and showing generally the relationship of the area of reduced thickness of the vane to the printed circuit board assembly when the printed board assembly is installed.

Now referring to FIGS. 7–10, the printed circuit board assembly 106 contains the strain gauge transducers 102, 104 and other electrical wiring 108 to transimit the electric signals from the strain gauge transducers 102, 104 that are gvenerated by the movement 100 of the vane 84 that strains the shank 28. The printed circuit board assembly 106 preferably has a rectangular cross-section (best seen in FIGS. 7 through 10). The printed circuit board assembly 106 can be covered with epoxy 110 or other suitable material to prevent contamination and to bind the strain gauge transducers 102, 104, wiring 107, 108, and other components onto the printed circuit board assembly 106, as shown in FIGS. 9 and 10.

To reduce effects of temperature variations on the strain gauges 102, 104 from thermal expansion and contraction of the printed circuit board 106, an intervening layer of metal 12, 13, such as copper, can be provided between the printed circuit board 106 and the respective strain gauges 102, 104, as shown in FIG. 10. The modulus of thermal expansion of a fiberglass and epoxy composite printed circuit board 106 is about $30 \times 10^{-6}$ in/in/° F., while the modulus of thermal expansion of the strain gauges 102, 104 is about $2 \times 10^{-6}$ in/in/° F. isolates the strain gauges 102, 104 to some extent from the more expansive and contractive printed circuit board 106. The epoxy layer 14, 15 between the copper 12, 13 and strain gauges 102, 104 is primarily for adhesion, while the outer epoxy coating 110 is for encapsulation.

A significant feature of the vortex shedding flow meter 40 according to the present invention is that it achieves a substantial improvement in signal to noise ratio over currently available vortex shedding flow meters without sacrificing the ruggedness or simplicity of the flow meter 40. The improvement in the signal to noise ratio is due in large part to the fact that the vane 84 and supporting neck formed by shank 28 are constructed from materials that have an average modulus of elasticity that is much less than that of stainless steel (typically about $30 \times 10^6$ p.s.i.), which is used for most vortex shedding flow meters. The vane 84, including shank 28 and webs 115, 117 in joint 20, can be made of, for example, glass-filled polycarbonate material having an average modulus of elasticity of about $1 \times 10^6$ p.s.i. Any other of a number of materials, such as Ultemp™ polyethylimide with a modulus of elasticity of about $1.3 \times 10^6$ p.s.i. or Noryl™ manufactured by General Electric Company of Pittsfield, Mass., with an average modulus of elasticity of about $0.5 \times 10^6$ p.s.i. can also be used. In general, materials with a modulus of elasticity of about $1 \times 10^5$ to $5 \times 10^6$ p.s.i. are prefenred for high sensitivity vortex detection according to this invention. In the preferred embodiment, the cylindrical housing or shank 28 and the shroud 26 preferably comprise a single piece of such low modulus of elasticity material, although it is the cantilevered mounlting joint 20 that is most important to be comprised of such material. The housing 82 of shroud 26, vane 84, of cantilevered mounting joint 20 can be made together in a single shot mold, which is well known to persons having ordinary skill in the art, thereby improving the consistency and similarity as well as calibrations of the vortex sensor assemblies 52 during their manufacture or mass production. The ability to mass produce the vortex sensor assembly 52 in a consistent manner is important, since each of the vortex shedding flow meters 40 must be individually calibrated, and any inconsistencies must be taken into account during the calibration process, as will be discussed in more detail below.

The flexible, low-modulus polycarbonate material in the cantilevered mounting joint 20 increases the magnitude of the vane 84 deflections for even very weak vortices 90, thus resulting in a substantial increase in sensitivity and signal to noise ratio, especially in low flow rates and in gaseous fluid flows or other situations where the vortices 90 are too weak for accurate detection and signal processing by ordinary vortex shedding flow meters. An additional increase in the signal to noise ratio can be achieved, as discussed above, by reducing the thickness of the cantilevered mounting joint 20 as compared to the vane 84 at one end of the vane 84. This area of reduced thickness acts as a flexible joint that allows greater amplitude motion of the vane 84, thus effectively mechanically preamplifying the deflection of the vane 84 before it is sensed by the two strain gauge transducers 102, 104 located on the printed circuit board assembly 106.

Another advantage of the vortex detector 10 is noise reduction. The light weight vane 84 is connected at one end to the housing or wall 82 portion of stemi 54 via the relatively flexible cantilevered mounting joint 20 which comprises hollow cylindrical shank 28 with radially extending webs 115, 117. A beneficial result of this arrangement is that the natural resonance frequency of the vane 84 is far higher than the frequency range of any vortex shedding frequency and noise vibrations likely to be encountered in the fluid 56 being measured, which means that the resonant frequency of the vane 84 of the vortex detector 10 is relatively insensitive to mechanical noise vibrations from external sources so that the distal end 22 of vane 84 can be left unrestrained in order to maximize sensitivity to the vortices 90 being shed from the vortex generator 84 with little if any likelihood that the vane 84 will be driven into potentially damaging resonant frequencies.

The significant noise reduction and increase in the signal to noise ratio resulting from the low modulus of elasticity materials used to construct the vane 84 and the supporting wall 82, as well as the mechanical pre-amplification effect of the cantilevered mounting joint 20 of the area of reduced thickness 112, allows the flow meter 40 equipped with the vortex detector 10 according to this invention to measure low flow velocities with far more accuracy and at much lower flow rates than was ever before possible with conventional vortex shedding flow meters. More specifically, the vortex shedding flow meter 40 of the present invention can be used to measure flow rates as low as 0.2 feet-per-seconid as compared to minimum flow rate measuring capabilities of conventional vortex shedding flow meters of about 1.0 ft/sec.

The sensitivity of the vortex shedding flow meter 40 is further increased by the addition of the inlet nozzle 58 to the upstream end of cylindrical housing or wall 82. Since the inlet area of inlet nozzle 58 is greater than the cross-sectional area of the flow passage 60, the fluid flowing through the passage 60 has a higher velocity than the fluid flowing througah the pipe sections 43, 45. This increase in the fluid velocity through the flow passage 60 effectively reduces the minimum flow velocity in the pipe sections 43, 45 that can be detected by the flow meter 40 and enhances the ability of this flow meter 40 to detect and measure flow rates of slower flowing fluids in the pipe sections 43, 45.

The details of the improved vortex shedding flow meter 40 will now be discussed in more detail and are best seen by refening at least initially to FIGS. 3–7 simultaneously. As was briefly described above, the vortex detector 10 in the vortex sensor assembly 52 forms the heart of the vortex shedding flow meter 40 and comprises a cylindrical housing or wall 82 that defines a cylindrical flow passage 60. In the preferred embodiment, the cylindrical housing 82 and the inlet nozzle 58 are molded of carbon and glass-filled polycarbonlate material such as Noryl®, manufactured by General Electric Plastic, of Pittsfield, Massachusetts, that has an average modulus of elasticity in the range of $0.5 \times 10^6$ to $1.0 \times 10^6$ p.s.i. The vortex generator 74 is positioned upstream of, and in substantially parallel alignment with, the elongated vane 84. In the preferred embodiment, the vortex generator 74 can be made from a separate piece of stainless steel, although other materials could be used just as easily, because the principal function of the vortex generator 74 is to be a bluff body, preferably with a substantially flat surface 86 interrupting the fluid stream flow in a manner that sheds vortices 90 from the sides 92, 94 of the vortex generator 74. The vortex generator 74 is positioned to extend diametrically across the flow passage 60 and is secured to diametrically opposite locations of the housing 82 of shroud 26. There are significant advantages to using a vortex generator 74 that is thin and has a small mass. More specifically, if some motion or vibration is created in the vortex generator 74, the regular, i.e., periodic, shedding of vortices 90 by the vortex generator 74 is improved, and aperiodic shedding of vortices 90 by the vortex generator 74 is reduced and possibly eliminated during short periods of time. The amount of motion or vibration of the vortex generator 74 is directly related to its mass. Therefore, if the vortex generator 74 is thin and has a small mass, motion or vibration of the vortex generator 74 is more easily created by the fluid 56 striking the vortex generator 74. The vortex generator 74 is still stable because it is rigidly fixed at both ends 78, 80 to diametrically opposite locations of the housing 82. In fact, the vortex generator 74 is preferably fixed at both ends to the hiousing 82. As previously discussed above, the vortex generator 74 and the vane 84 are preferably positioned so that a relatively small gap 85 exists between them, as best seen in FIG. 7. The gap 85 can be, for example, 0.0001 inches. The gap 85 will fill with part of the fluid 56 flowing through the pipe sections 43, 45 and the vortex sensor assembly 52 and, therefore, will act as a fluidic damipener to dampen the vibration of the vane 84, which can help to prevent physical damage in the unlikely or rare events that the period of the vortices 90 striking the vane 84 cause the vane 84 to vibrate such that the vibrations approach or reach the vane's 84 resonance or natural frequency.

Referring now primarily to FIGS. 7 and 11 along with FIGS. 1, 3, and 5, the vane 84 includes an area of reduced thickness 112 at the cantilevered mounting joint 20 that is smaller than the cross-scctional area of the rest of the vane 84 so that most of the strain in vane 84 caused by the action of the vortices 90 on the sides 96, 98 of the vane 84 is concentrated in the area of reduced thickness 112, where such strain is sensed by the strain gauge transducers 102, 104 on the printed circuit board assembly 106. The area of reduced thickness 112 of the vane 84 includes a circular bore 114 extending from the bore 19 at the top 116 of the shank 28 substantially all the way to the bottom 118 of the shank 28 in the area of reduced thickness 112 The bore 114 in the area of reduced thickness 112 has to be even smaller than the shank 28, but it has a diameter that is just large enough so that the end 120 of the printed circuit board assembly 106 on which the strain gauge transducers 102, 104 are mounted (see FIGS. 8–11) can be inserted into the bore 114 to a position in the neck formed by the shank 28, where the strain is most concentrated. However, the bore 114 is not large enough to allow the entire printed circuit board assembly 106 to be positionable within the bore 114. When the end 120 of the printed circuit board assembly 106 is inserted into the bore 114 to the shoulder 121, the strain gauge transducers 102, 104 on the printed circuit board assembly 106 will be positioned as close as possible to the inside surface of the bore 114 on opposite sides of a plane that contains the longitudinal axis 77 of the vane 84 (see FIG. 5) and the central axis 76 of the flow passage 60 (see FIGS. 6 and 7) in order to have the strain gauges 102, 104 undergo as much of the strain in shank 28 as possible. The closer the strain gauges 102, 104 are positioned to the inside surface of the bore 114, the farther they will be from the longitudinal axis 77 of the vane 84, thus the more strain they will undergo, and the stronger the resulting electric signals from the strain gauges 102, 104 will be. As will be discussed in more detail below, the stem 54 has all internal structure that requires the printed circuit board assembly 106 to be inserted into the bore 114 in an orientation with the strain gauge transducers 102, 104 oriented on opposite sides and equidistant from the plane that includes the vane axis 77 and the central axis 76 of the flow passage 60 as described above and preferably equidistant from the sides 126, 128 of the area of shank 28 in reduced thickness 112, as shown in FIGS. 7 and 11

Figure 12:
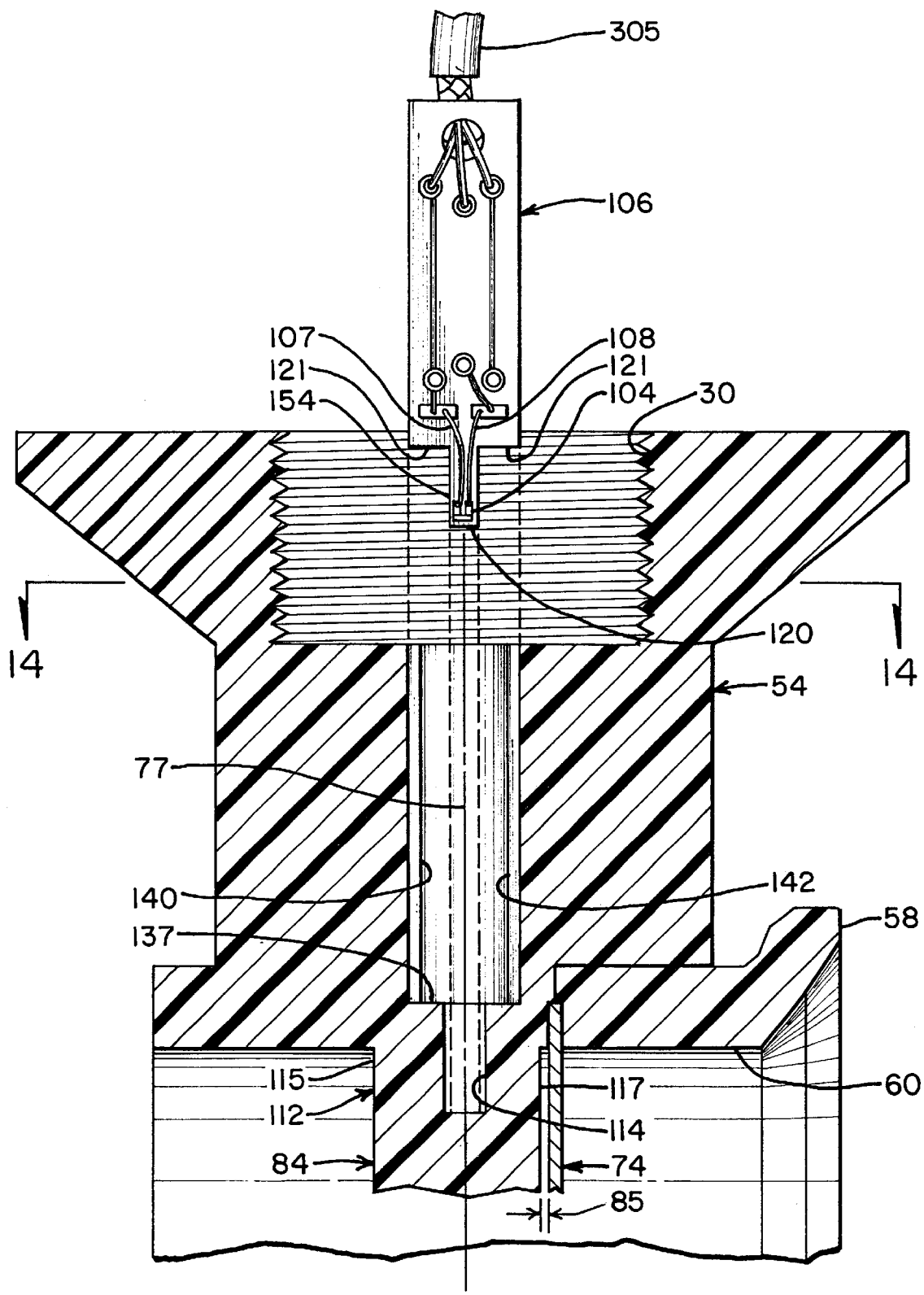
FIG. 12 is the sectional view of the stem and area of reduced thickness portion of FIG. 5 enlarged to reveal the printed circuit board prior to insertion of the printed circuit board into the stem of the vortex sensor assembly.
Figure 13:
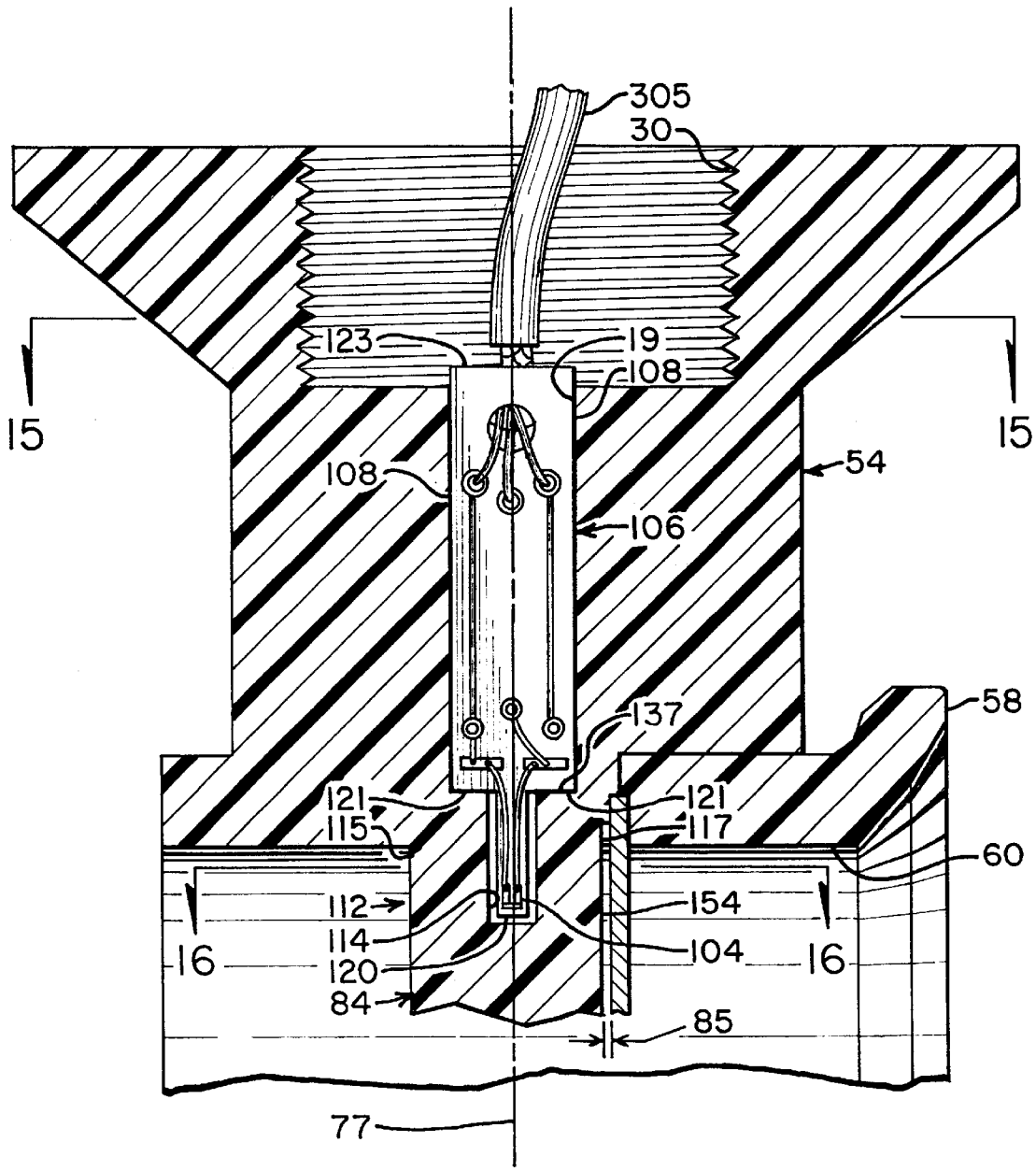
FIG. 13 is an enlarged sectional view of the stem and area of reduced thickness portion similar to FIG. 12, but with the printed circuit board positioned in the stem of the vortex sensor assembly into the area of reduced thickness of the vane.

Now referring to FIGS. 5, 11–17, the installation of the printed circuit board assembly 106 in the hole 19 in stem 54 will now be discussed in more detail. Referring initially to FIGS. 5 and 11–13, the printed circuit board assembly 106 can be inserted into the hole 19 in stem 54 so that the end 120 of the printed circuit board assembly 106 and the strain gauge transducers 102, 104 are positioned into the small diameter bore 114 at the bottom of hole 19 that extends into the shank 28 in the area of reduced thickness 112 and so that the edge 121 of the printed circuit board assembly 106 is positioned adjacent the ledge 137, as shown in FIGS. 12 and 13.

Figure 14:
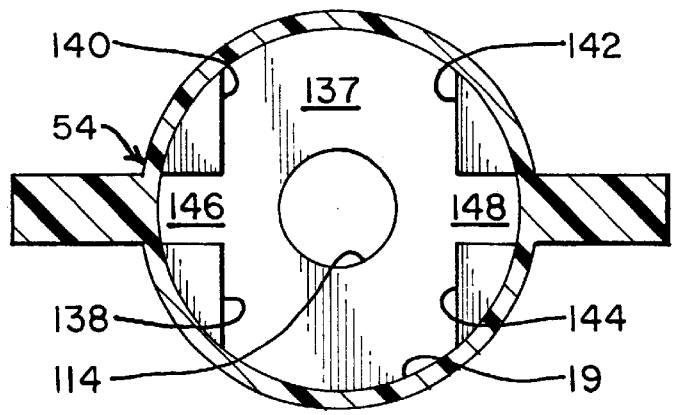
FIG. 14 is an enlarged sectional view of the stem of the vortex sensor assembly of FIG. 4 taken along the line 14—14 of either FIG. 5 or FIG. 12, but illustrating the view prior to insertion of the printed circuit board assembly into the stem and shank.
Figure 15:
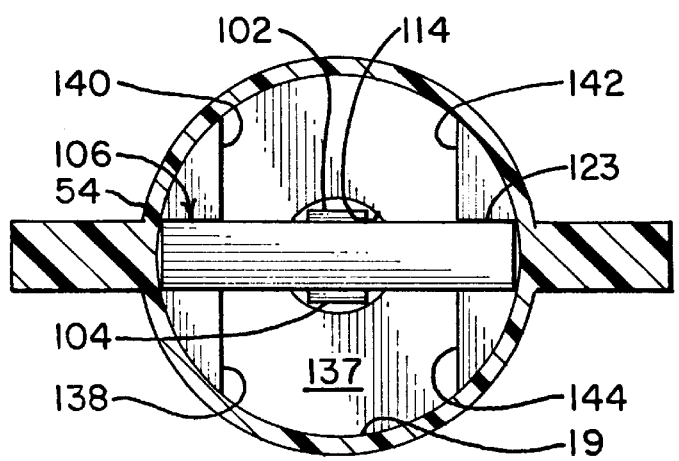
FIG. 15 is an enlarged sectional view of the stem of the vortex sensor assembly similar to FIG. 14, but with the printed circuit board assembly positioned in the stem such that it is also a cross-section view taken along section line 15—15 of FIG. 13.
Figure 16:
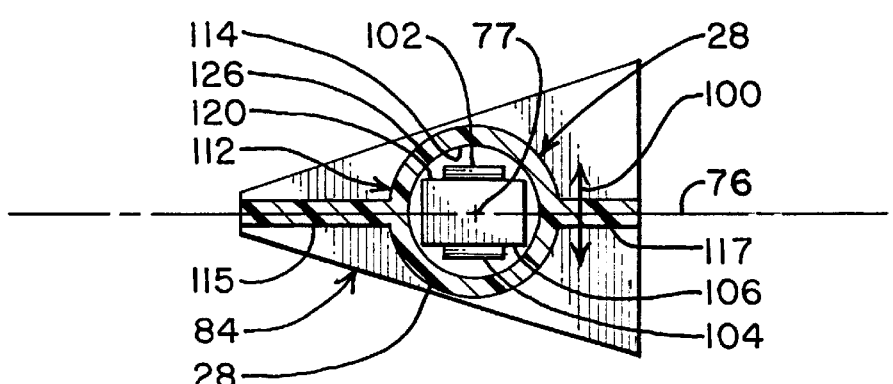
FIG. 16 is and enlarged sectional view of the stem of the vortex sensor assembly similar to FIG. 7, with the printed circuit board assembly positioned in the stem taken along the line 16—16 of FIG. 13.

Now referring to FIGS. 14 and 15, the stem 54 includes four guides 138, 140, 142, 144 to align the printed circuit board assembly 106 within the slot 146 created between the guides 138, 140 and within the slot 148 created between the guides 142, 144 when the printed circuit board assembly 106 is inserted into the hole 19 in stem 54. Epoxy or other potting inaterial is preferably placed into hole 19 and into the smaller diameter bore 114 in stem 54 prior to insertion ofthe circuit board assembly 106 so that the printed circuit board assembly 106 is held rigidly in place by the epoxy 24, as best seen in FIGS. 1 and 11, after insertion. The guides 140 and 142 in the stem 54 can also be seen in FIG. 12. The guides 138, 140, 142, 144 are arranged such that the printed circuit board assembly 106 can only be inserted into the stem 54 in such a way that the strain gauge transducers 102, 104 are both adjacent the area of reduced thickness 112 in shank 28 of the vane 84 and so that the strain gauge transducers 102, 104 on respectively opposite sides of a plane that includes both axes 76, 77, as described above, and as shown in FIGS. 7 and 16.

The arrangemcint of the first and second strain gauge transducers 102, 104 on opposite sides of the printed circuit board assembly 106 and on the opposite sides of the plane described above and in the area of reduced thickness 112 means that the electric voltage signals produced by the strain gauge transducers 102, 104 will have identical frequencies, but opposite amiplitudes, for given displacements 100 of the vane 84. These substantially equal but opposite signals can be converted into a combined signal having the same frequency, but twice the amplitude, as is well-known in the art. The fine wires 107, 108 from each strain gauge transducer 102, 104 can be connected to larger wires 305 by any convenient connectors as shown in FIGS. 8, 9, and 13 to transmit the signals to appropriate amiplifiers and signal processing circuits, for example, the electric circuitry 36 in FIG. 5. Alternatively, the wires 107, 108 from the strain gauge transducers 102, 104 can be embedded into the printed circuit board assembly 106 or can comprise etched metallic land lines on the printed circuit board assembly 106. For example, as shown in FIGS. 8 and 9, the printed circuit board 106 has a common lead 301 that connects to both strain gauges 102, 104, and separate leads 302, 303 that connect to respective strain gauges 102, 104 to carry the signals. The slielding 304 of wire cord 305 connects by solder 306 to the printed circuit board 106, and the wire cord 305 carries the signals to the electric circuitry 36 in the housing 70 (FIG. 5). In addition, the wires 107, 108 in FIGS. 8 and 9 can be electrically connected or bridged on the printed circuit board assembly 106 so as to form a single electric voltage signal generated by the strain gauge transducers 102, 104 that has twice the amplitude and the same frequency as the electric voltage signals generated by either of the strain gauge transducers 102, 104 individually. Due to the orientation of the printed circuit board assembly 106 in the stem 54, as described above, the strain measured by the strain gauge transducers 102, 104 on the printed circuit board assembly 106 are not effected by pressure diffcrentials in the fluid 56, since the pressure differentials in the fluid 56 would be applied equally to both sides 126, 128 of the shank 28 in the area of reduced thickness 112 of the vane 84.

Figure 17:
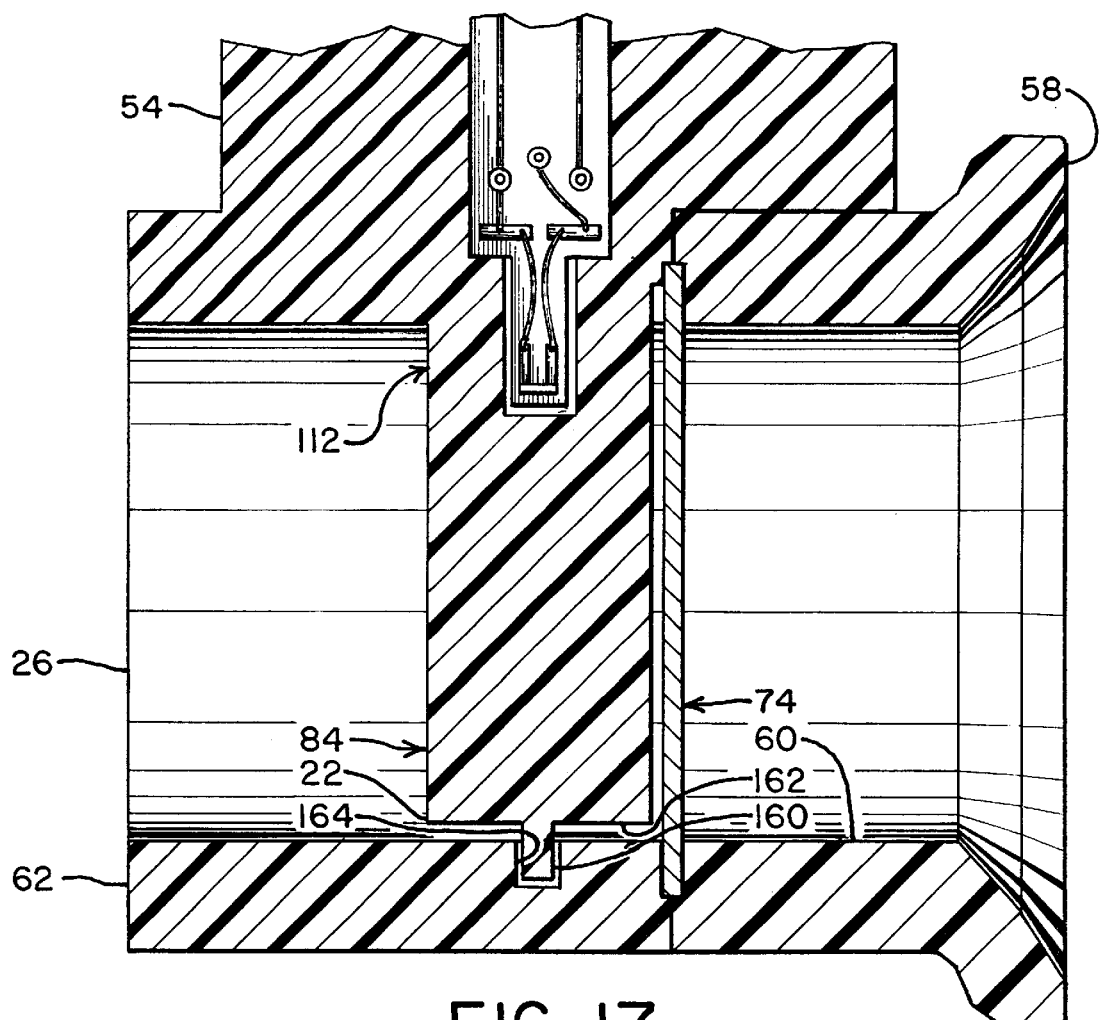
FIG. 17 is an enlarged cross-sectional view of the vortex sensor assembly similar to FIG. 5, but also including a motion limit mechanism to limit motion of the free end of the vane.
Figure 18:
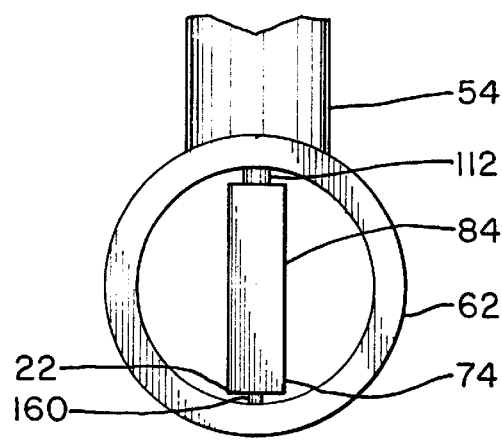
FIG. 18 is a rear elevation view of the embodiment of FIG. 17 of the downstream end of the vortex sensor assembly of the vortex generating flow meter of the present invention.

An alternate feature of the vortex detector 10 of the present invention includes a dowel pin 160 extending downward from the bottom surface 162 of the distal end 22 of the cantilevered vane 84 and into a hole 164 in the lousing 82 of shroud 26, as shown in FIGS. 17 and 18 to limit amplitude of vibrations of the vane 84 in the rare circumstance that noise or mechanically induced vibrations might drive the vane 84 into resonant frequency. The dowel pin 160 preferably has a circular cross-section but it also is possible for the dowel pin 160 to have a cross-section that is square, rectangular, trianguilar, oval, or some other shape. The dowel pin 160 is rigidly attached or an extension of the vane 84, but it is not attached to the cylindrical housing or wall 82. In fact, the hole or bore 164 in the housing 82 into which the dowel pin 160 extends has a diameter that is larger than the diameter of the dowel pin 160 such that a gap exists between the dowel pin 160 and the bore 164. The gap between the dowel pin 160 and the inside surface of the inside surface of the bore 164 can be, for example, 0.001 inches radially. Using the dowel pin 160 limits the amplitude of the vibrations of the vane 84. It can be important to limit the amplitude of motion 100 of the vane 84 to prevent damage when, for example, the vibrations of the vane 84 are approaching or in the vane's 84 resonance or natural frequency.

In operation, the vortex generating member or bluff body 74 generates a vortex street comprising a plurality of vortices 90 that are alternately shed from opposite sides 92, 94 of the vortex generating member 74, as best seen in FIG. 7. As is well-known, the frequency at which the vortices 90 are shed by the vortex generator 74 is directly proportional to the velocity of the fluid 56 moving through the flow passage 60 divided by the lateral width of the vortex generator 74. As the vortices 90 pass over the vane 84, they exert alternating pressures or forces on the vane 84 in the transverse direction of arrow 100, causing the vane 84 to vibrate or deflect at the same frequency as the shed vortices 90 and at an amplitude that is proportional to the strengths of the vortices 90. The deflections of the vane 84 are detected by the strain gauge transducers 102, 104 located in the shank 28 in the area of reduced thickness 112 and on the printed circuit board assembly 106. The velocity of the fluid 56 and the volume or mass flow rate of the fluid 56 flowing through the fluid passage 60 can then be detemined from the frequency of the alternating vane 84 deflections or vibrations, in accordance with well-known principles and as will be discussed in more detail below.

The strain gaughe transducers 102. 104 located on the printed circuit board assembly 106, that are potted with epoxy 24 along with the printed circuit board 106 into a unitary mass with the shank 20, as illustrated in FIGS. 1 and 11, detect the deflections of the vane 84 caused by the vortex street flowing through the flow passage 60, as shown in FIG. 7 and previously discussed above. The arrangement of the strain gauge transducers 102, 104 on opposite sides of the printed circuit board assembly 106 and opposite sides 126, 128 of the shank 28 in the area of reduced thickness 112 on the vane 84 means that the electric signals produced by the strain gauge transducers 102, 104 will have identical frequencies, but opposite amplitudes, for a given displacement of the vane 84, as was also described briefly above. These substantially equal but opposite signals can be converted into a combined signal having the samle frequency, but twice the amplitude, as is well-known in the art. Also, by placing the strain gauges 102, 104 in the shank 28 with the shank 28 positioned in the same pressure environment as the vane 84, i.e., in the fluid flowing through the vortex sensor assembly 52, the strain gauges 102, 104 are not subject to strains in the stem or other components caused by fluctuations of pressure in the fluid relative to atmospheric or other pressures exteal to the flow miectci body 50, which is a problem in some other vortex shedding flow meters where strain gauges or other transducers are placed on parts that are exposed to the fluid pressure on one side and to the atmosphere or external environment on the other side.

Now referring primarily to FIG. 19 with occasional reference to other figures, the signal processing of the electric signals generated by the strain gauge transducers 102, 104 will now be discussed in more detail. During normal operation of the vortex shedding flow meter 40, the flow rate or velocity of the fluid 56 flowing through the flow passage 60 (FIG. 7) is calculated approximately ten times per second and provided to an output device specified by the user. As previously discussed above, the velocity of the fluid 56 is directly related to the frequency of the vortex street. Since it is possible, however, for vortices 90 in the vortex street to be shed in a non-regular or non-periodic manner from the vortex generator 74, the frequency of the vortex street as sensed by the strain gauge transducers 102, 104 may fluctuate, particularly when the fluid 56 is flowing at a very low velocity such as, for example, 0.2 feet per second, even though the velocity of the fluid 56 has not actually changed. As a result, the calculation of the velocity of the fluid 56 may inadvertently be prone to errors. Therefore, the vortex shedding flow meter 40 preferably determines the fluctuations of the frequency of the vortex street as detected by the strain gyau(ge transducers 102, 104 and provides a calculation ofthe velocity of the fluid 56 that takes such possible frequency fluctuations into account such that an accurate calculation of the flow rate (velocity) of the fluid 56 is made, as will be discussed in more detail below. In general, and as will also be discussed in more detail below, the electric voltage signals generated by the strain gauge transducers 102, 104 are used by the vortex shedding flow meter 40 to create both an analog voltage signal representation of the frequency of the vortex street, and a digital voltage signal representation of the frequency of the vortex street. The amplitude of the analog representation of the frequency of the vortex street is used to determine the validity of the digital representation of the frequency ot thie vortex street. The frequency of the electric voltage signal created by the strain gauge transducers 102, 104 is equal to the frequcicy ofthe vortex street, and the frequency of the electric voltage signal is not altered by the electronic circuitry of the vortex shedding flow meter 40.

Figure 19:
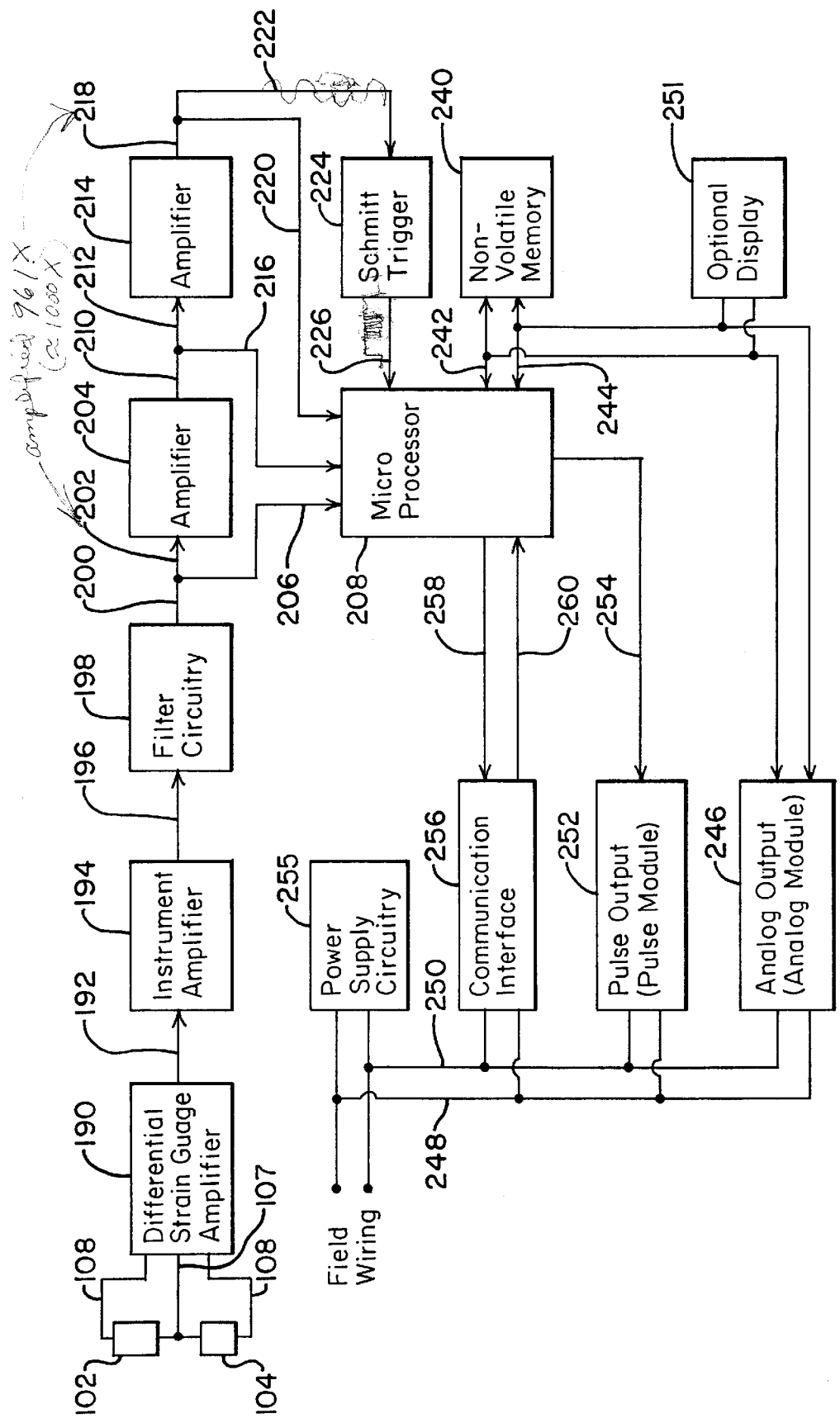
FIG. 19 is functional block diagram of the signal processing performed on the electronic signals created by the strain gauge transducers in the vortex sensor of this invention.

The strain gauge transducers 102, 104 are connected via the leads 107, 108 and intervening leads 301, 302, 303 and cord 305 (FIGS. 8 and 9) to the differential strain gauge amplifier 190, as best seen in FIG. 19, which amplifies (with a gain of approximately eight) the differential between the two strain gauge transducers 102, 104 with a direct-coupled common-base differential amplifier. The collector voltage of the differential pair is monitored and controlled with a feedback circuit so as to simulate a constant current source for each of the strain gauge transducers 102, 104 and to compensate for the temperature coefficient of resistance of the strain gauge transducers 102, 104, which can vary significantly with changes in temperature, such that the amplitude of the electric voltage signal created by the differential strain giaug(e amplifier 190 on the lead 192 is independent of variations in temperature. Therefore, the readings created by the vortex shedding flow meter 40 of the present invention are also generally independent of variations in temperature. The differential strain gauge amplifier 190 also preferably acts as a low pass filter with a single pole low pass filter response and a cutoff frequency of about 170 hertz to help reduce high frequency noise signals that may be present in the electric voltage signal from the strain gauge transducers 102, 104.

The output electric voltage signal from the differential strain gauge amplifier 190 on the lead 192 is the input signal to the instrumentation amplifier 194, which further amplifies (with a gain of approximately eighteen) the electric voltage signal on the lead 192. The gain of the instrumentation amplifier 194 is set low enough such that its output voltage signal on the lead 196 is not clipped at its maximum possible voltage signal amplitude (i.e., the instrumentation amplifier 194 is not saturated), regardless of the amplitude of the input electric voltage signal on the lead 192.

The Output electric voltage signal from the instrumentation amiplifier 194 on the lead 196 is the input signal to the filter circuitry 198 which acts as a bandpass filter to remove frequencies lower than 1.75 hertz and higher than 450 hertz. More specifically, the filter circuitry 198 acts to remove any low frequency noise from the strain gauge transducers 102, 104, the differential strain gauge amplifier 190, and the instrumentation amplifier 194 and also acts to remove high frequency noise resultilng from mechanical and electrical sources and the resonance frequency of the vortex shedding flow meter 40 or any component thereof. If desired, the filter circuitry 198 can be implemented as a combination of two filters, a high-pass filter with a two-pole Butterwortih response and a cutoff frequency ($f_c$) of 1.75 hertz followed by a low-pass filter with a two-pole Chebyshev response and a cutoff frequency ($f_c$) of 150 hertz. The design of band pass filters is well known to those people having ordinary skill in the art and need not be discussed in any further detail for purposes of the present invention. More specific information regarding the design and operation of filters can be found in DAVID E. JOHNSON, INTRODUCTION TO FILTER THEORY (1976), published by Prentice-Hall, Inc., of Englewood Cliffs, N.J.

The output electric voltage signal from the filter circuitry 198 on the lead 200 becomes the input voltage signal on the lead 202 to the amplifier 204 and the input voltage signal on the lead 206 to the microprocessor 208. The input electric voltage signal on the lead 206 to the microprocessor 208 will be discussed in more detail below. The input electric voltage signal on the lead 202 to the amplifier 204 is amplified by the amplifier 204. The output electric voltage signal from the amplifier 204 on the lead 210 becomes the input voltage signal on the lead 212 to the amplifier 214 and the input voltage signal on the lead 216 to the microprocessor 208. The input electric voltage signal on the lead 216 to the microprocessor 208 will be discussed in more detail below. The input electric voltage signal on the lead 212 to the amplifier 214 is amplified by the amplifier 214 such that the amplitude of the output electric voltage signal on the lead 218 from the amplifier 214 is approximately one thousand (1,000) times time amplitude of the electric voltage signal on the lead 202 to the amplifier 204. More specifically, each of the amplifiers 204, 214 preferably amplifies the input voltage signals on the leads 202, 212, respectively, approximately by a factor of thirty-one (31) such that the amplitude of the output electric voltage signal on the lead 218 from the amplifier 214 is approximately 961 times the amplitude of the electric voltage signal on the lead 202 to the amplifier 204. Both of the amplifiers 204, 214 also act as a filter and provide a three decibel rolloff at a cutoff frequency of approximately fifteen hertz to rid the electric output voltage signals on the leads 210, 218 of mechanical noise, particularly at low flow rates of the fluid 56. The output electric voltage signal from the amplifier 214 on the lead 218 becomes the input voltage signal on the lead 220 to the microprocessor 208, and the input voltage signal on the lead 222 to the Schmitt trigger circuitry 224.

The input electric voltage signals to the microprocessor 208 on the lead 206 from the filter circuitry 198, the lead 216 from the amplifier 204, and the lead 220 from the amplifier 214 are used by the microprocessor 208 for monitoring the electric voltage signals on the leads 206, 216, 220 and, most importantly, for determining whether or not the electric voltage signals being generated by the strain gauge transducers 102, 104 are a result of vortices 90 acting on the vane 84, as will be discussed in more detail below.

As previously discussed above, the output electric voltage signal from the amplifier 214 on the lead 218 becomes the input voltage signal on the lead 222 to the Schmitt trigger circuitry 224. A Schmitt trigger is a pulse generator in which the output of the Schmitt trigger becomes a first value (for example, zero (0) volts) if the amplitude of the input signal to the Schmitt trigger falls below a low threshold value, and the output of the Schmitt trigger becomes a second value (for example, five (5) volts) if the amplitude of the input signal to the Schmitt trigger rises above a high threshold value. If tle Output voltage signal of the Schmitt trigger is currently the first value, then the output of the Schmitt trigger will not change from the first value to the second value until the amplitude of the input signal to the Schmitt trigger rises above the high threshold value. Conversely, if the output voltage signal of the Schmitt trigger is currently the second value, then the output of the Schmitt trigger will not chiange from the second value to the first value until the amplitude of the input siginal to the Schmitt trigger falls below the low threshold value. The difference between the low threshold value and the high threshold value determines the hysteresis of the Schmitt trigger. Schmitt triggers are well known to persons having ordinary skill in the art and need not be discussed in any further detail for purposes of this invention.

In the vortex shedding flow meter 40 of the present invention, the Schmitt trigger circuitry 224 has 0.12 volts of hysteresis to prevent low level noise generated by the absence of a periodic vortex 90 in the vortex street from reaching the microprocessor 208. The Schmitt trigger circuitry 224 is preferably included in the electronic circuitry of the vortex shedding flow meter 40 to remove low level electric noise signals. The shedding of the vortices 90 in the vortex street by the vortex generator 74 is not absolutely regular (i.e., periodic) and, in addition, while the shedding of the vortices 90 in the vortex street will typically alternate such that a vortex 90 will be shed from one side 92 of the vortex generator 74 and then from the other side 94 of the vortex generator (see FIG. 6), there will be times when two consecutive vortices 90 are shed from the same side 92 or 94 of the vortex generator 74. When two consecutive vortices 90 are generated by the same side 92 or 94 of the vortex generator 74, low level noise is created that may be inadvertently detected by the strain gauge transducers 102, 104. The use of the Schmitt trigger circuitry 224 between the leads 222, 226 prevents such low level noise on the output voltage signal from the amplifier 214 from reaching the microprocessor 208 on the lead 226, as will be discussed in more detail below.

The output electric voltage signal from the Schmitt trigger circuitry 224 on the lead 226 is an input voltage signal to the microprocessor 208 and comprises a pulsed digital voltage signal having a rectangular waveform, a maximum amplitude of approximately 4.2 volts, and a minimum amplitude of approximately zero (0) volts. Since the differential strain gauge amplifier 190, the instrumentation amplifier 194, the filter circuitry 198, and the amplifiers 204, 214 do not alter the frequency of the electric voltage signal generated by the strain gauge transducers 102, 104, the frequency of the input electric voltage signal from the Schmitt trigg,cr circuitry 224 to the microprocessor 208 on the lead 226 represents the frequency of the vortex street. The processing of the input electric voltage signals by the microprocessor 208 on the leads 206, 216, 220, and 226 will now be discussed in more detail.

As previously discussed above, the microprocessor 208 receives input electric voltage signals from the filter 198 on the lead 206, the amplifier 204 on the lead 216, the amplifier 214 on the lead 220, and the Schmitt trigger circuitry 224 on the lead 226. As also previously discussed above, the vortex shedding flow meter 40 operates on the principle that the vortex generator 74, when placed in a moving fluid 56, will produce an altetiating series of vortices 90, called a voitcx street, at a frequency that is directly related to the velocity of the moving fluid 56. As the vortices 90 in the vortex street pass ovcie the vane 84, alternating, lateral forces deflect the vane 84 one way and then the other. The strienluths of the vortices 90 in the vortex street are related to the density of the fluid 56 and the fluid's velocity. More specifically, the amplitude (strength) of the vortices 90 is proportional to the square of the frequency of the vortex street, such that as the freequency of the vortex street increases, the amplitude (strength) of the vortices 90 and the electric voltage signals generated by the strain gauge transducers 102, 104 also increase. Unfortunately, the vortices 90 in the vortex street are not regular (i.e., periodic) and there may be cases when the vortices 90 in the vortex street are shed in groups from one side 92, 94 of the vortex generator 74 or the other instead of being shed alternately from the sides 92, 94 of the vortex generator 74. In fact, it is quite common for the vortices 90 in the vortex street to be shed in groups from one side 92, 94 of the vortex generator 74 when the fluid 56 is flowing at a very slow rate. Therefore, it is preferable for the vortex shedding flow meter 40 to be able to discriminate between the presence of vortices 90 and the absence of vortices 90 in the vortex street and to be able to determine the frequency of the vortices 90 in the vortex street even when the vortices 90 are being shed in groups from the vortex generator 74 such that a fluctuating calculation of the velocity of the fluid 56 is not provided to the user of the vortex shedding flow meter 40.

The microprocessor 208, which can be a PIC16C73 Microcontroller manufactured by Microchip of Chandler, Ariz., determines the frequenecy of the vortices 90 in the vortex street in both an analog foinat and a digital format. More specifically, the analog electric voltage signals on the leads 206, 216, and 220 from the filter circuitry 198, the amplifier 204, and the amplifier 214, respectively, are used to provide the frequency of the vortex street to the microprocessor 208 in an analog signal format while the digital electric voltage signal on the lead 226 from the Schmitt trigger 224 provides the frequency of the vortex street to the microprocessor 208 in a digital signal format.

As previously discussed above, the analo, voltage signals on the leads 206, 216, 220 are used by the microprocessor 208 to determine if the electric voltage signals generated by the strain gauge transducers 102, 104 represent a vortex 90 acting on the vane 84. More specifically, the vortex shedding flow meter 40 preferably discriminates between low level noise created by the aperiodic shedding of the vortices 90 and other mechanical or resonating sources and the presence of vortices 90 acting on the vane 84, both of which can cause vibrations in the vane 84 and, as a result, electric voltage signals from the strain gauge transducers 102, 104. If the vibrations in the vane 84 caused by low level noise are not detected by the vortex shedding flow meter 40, inaccurate calculations of the velocity of the fluid 56 may result. Fortunately, the amplitude of the vibrations of the vane 84 caused by low level noise or other sources other than vortices 90 striking the vane will be considerably lower than the amplitude of the vibrations of the vane 84 caused by a vortex 90 striking the vane 84.

In order to discriminate between signals created by the strain gauge transducers 102, 104 as a result of the presence of vortices 90 and signals created by the strain gauge transducers 102, 104 as a result of mechanical sources, aperlioclic shedding of vortices 90 from the vortex generator 74, or low level noise, the micropocessor 208 uses the amplitude of the electric voltage signals from the filter circuitry 198, the amplifier 204, and the amplifier 214 to determine whether or not a vortex 90 is present. While all three ofthe leads 206, 216, 220 provide an input analog voltage signal to the microprocessor 208, only one of the three analog voltage signals on the leads 206, 216, 220 will be selected and used by the microprocessor 208 at any given time to verify the presence of a vortex 90 acting on the vane 84.

As previously discussed above, as the frequency of the vortex street increases, the strength of the vortices 90 increase and the strength of the vortices 90 is proportional to the square of the frequency of the vortex street. Therefore, as a result of the increase in the frequency of the vortex street, the amplitude of the electric voltage signal generated by the strain gauge transducers 102, 104 will also increase and will be proportional to the square ofthe frequency of the vortex street. Thus, by monitoring the amplitude of the electric voltage signal on the three leads 206, 216, 220, the microprocessor 208 can determine the presence or absence of a vortex 90 acting on the vane 84.

The need for the three leads 206, 216, 220 and the analog electric voltage signals contained thereon will now be discussed in more detail. While the amplifiers 204, 214 have heretofore been discussed as ideal amplifiers (i.e., amplifiers that have no maximum amplitude for their output signals), the amplifiers 204, 214 are, in fact, not ideal and will become saturated if the amplitude ofthe input voltage signals on the leads 202, 212, respectively, are too high. That is, the non-ideal amplifiers 204, 214 have a maximum amplitude that their output voltage signals on the leads 210, 218, respectively, can have, regardless of the amplitude of the input voltage signals on the leads 202, 212. When the analog voltage signal from the filter circuitry 198 on the lead 200 is amplified by the amplifiers 204, 214, it is possible for the amplified voltage signals on the lead 210 and/or the load 218 to be clipped, i.e., it is possible that the amplitude of the input voltage signals to either or both of the amplifiers 204, 214 is already so high that amplifiers 204, 214 cannot properly amiplify the electric voltage signal due to physical and electrical limitations of the amplifiers 04, 214. In this situation, the amiplifier 204 and/or the amplifier 214 are saturated and the amplitude of the electric voltage output signal on the lead 210 and/or the lead 218 are clipped to a maximum value.

Since the strength of the vortex 90 and, therefore, the amplitude of the electric voltage signal generated by the strain gauge transducers 102, 104 when the vortex 90 acts on the vane 84, increase as the frequency ofthe vortex street increases, the amplifiers 204, 214 will become saturated when the frequency of the vortex street has reached certain frequelicy levels. More specifically, when the frequency ofthe input voltage signal to the amplifier 214 on the lead 212 has a frequency that is less than or equal to approximately five hertz (5 Hz), the amplifier 214 is not saturated and the output voltage signal on the lead 218 is not clipped. When the frequency of the input voltage signal to the amplifier 214 on the lead 212 has a frequency that greater than approximately five hertz (5 Hz), the amplifier 214 is saturated and the output voltage signal on the lead 218 is clipped to its maximum value of approximately 4.3 volts peak-to-peak.

When the frequncicy of the input voltage sitgnal to the amplifier 204 on tile lead 202 has a frequency that is less than or equal to approximately thirty hertz (30 Hz), the amplifier 204 is not saturated and the output voltage signal on the lead 210 is not clipped, although, as discussed immediately above, the amplifier 214 is still saturated and the electric voltage signal on the lead 218 is still clipped to its maximum value of approximately 4.3 volts peak-to-peak. When the frequency of the input voltage signal to the amplifier 204 on the lead 202 has a frequency that greater than approximately thirty hertz (30 Hz), both of the amplifiers 204, 214 are saturated and the output voltage signals on the leads 210, 218 are clipped to their maximum values of approximately 4.3 volts peak-to-peak.

The microprocessor 208 samples the amplitude of each of the three analog electric voltage signals on the leads 206, 216, 220 approximately twice a millisecond to determine which of the three analog electric voltage signals will be selected and used by the microprocessor 208 to determine the validity of the digital voltage signal on the lead 226 (i.e., to determine whether or not the electric voltage signal generated by the strain gauge transducers 102, 104 is the result of a vortex 90 acting on the vane 84). If the microprocessor 208 determines that the amplitude of the analog electric voltage signal on the lead 220 is less than approximately 4.3 volts peak-to-peak, the signal on the lead 220 is selected and used. If the microprocessor 208 determines that the amplitude of the analog electric voltage signal on the lead 220 is more than approximately 4.3 volts peak-to-peak, the signal on the lead 220 is not used and the microprocessor 208 then determines the amplitude of the electric voltage signal on the lead 216. If the microprocessor 208 determines that the amplitude of the analog electric voltage signal on the lead 220 is more than approximately 4.3 volts peak-to-pcak and that the amplitude of the analog electric voltage signal on the lead 216 is less than approximately 4.3 volts peak-to-peak, the signal on the lead 216 is selected and used by the microprocessor 208. If the microprocessor 208 determines that the amplitude of the electric voltage signals on both of the leads 216, 220 are greater than approximnately 4.3 volts peak-to-peak, the microprocessor 208 selects and uses the elctric voltage signal on the lead 206 to determine the validity of the digital voltage signal on the lead 226, which will now be discussed in more details As previously discussed above, when a vortex 90 acts on the vane 84, the vane 84 deflects and vibrates, thereby causing the strain gauge transducers 102, 104 to generate electric voltage signals on the leads 107, 108. It also is possible that mechanical noise will cause the vane 84 to vibrate, thereby causing the strain gauge transducers 102, 104 to create electric voltage signals even when there is not a vortex 90 acting on the vane 84. In order for the vortex shedding flow meter 40 to produce an accurate reading of the velocity of the fluid 56, the vortex shedding flow meter 40 preferably discriminates between the electric voltage signals created by the strain gauge transducers 102, 104 as a result of low level noise and the electric voltage signals created by the strain gauge transducers 102, 104 as a result of a vortex 90 acting on the vane 84. In order to provide this discrimination, the microprocessor 208 determines whether or not the digital voltage signal on the lead 216 from the Schmitt triglger circuitry 224 represents the presence of a vortex 90 acting on the vane 84 by using the amplitude of the analog voltage signal selected from the three analog voltage signals on the leads 206, 216, 220.

The microprocessor 208 can determine if the digital electric voltage signal on the lead 226 represents a vortex 90 acting on the vane 84 by simultaneously monitoring the amplitude of the analog electric voltage signals on the leads 206, 216, 220. If the amplitude of the analog voltage signal on the selected lead 206, 216, or 220 is too low (i.e. below a minimum threshold), for example, if the amplitude of the analog voltage signal on the lead 206 is below approximately 4.3 volts peak-to-peak, the amplitude of the unclipped analog voltage signal on the lead 216 is below approximately 4.3 volts peak-to-peak, or the amplitude of the unclipped analog voltage signal on the lead 220 is below approximately 4.3 volts pealk-to-peak, then the micropro- cessor 208 assumes that the dligital voltage signal on the lead 226 does not represent a vortex 90 acting on the vane 84. If the amplitude of the analog voltage signal on the selected lead 206, 216, or 220 is above the minimum threshold, the microprocessor 208 asstumes that the digital voltage signal on the lead 226 represents a vortex 90 acting on the vane 84. As previously stated above, the vortex shedding flow meter 40 preferably computes the flow rate or velocity of the fluid 56 flowing in the flow passage 60 approximately ten times a second. The discrimination technique discussed above is used by the microprocessor as one method of determingi that updating the flow rate or velocity of the fluid 56 is not necessary as will be discussed in more detail below.

In addition to the discrimination technique discussed immediately above, the microprocessor 208 reduces the effect of short term variations in the frequency of the vortex street when calculating the velocity of the fluid 56. More specifically, the frequency of the vortex street tends to vary significantly over short time periods (i.e., time periods shorter than approximately one second), but the integrated frequency over long time intervals (i.e., time periods longer than approximately one minute) is accurate and repeatable. In addition, the user of the vortex shedding flow meter 40 may not desire readings indicating the velocity of the fluid 56 that vary significantly during very short time periods. Therefore, the microprocessor 208 implements a two-part algorithm that provides an accurate determination of the velocity of the fluid 56 that is not significantly changed by fluctuations of the velocity of the fluid 56 during short time intervals. The first part of the algorithm "averages" the frequency of the digital voltage signal on the lead 226 over a fixed time period and the second part of the algorithm "smooths" the resulting average, as will now be discussed in more detail.

Figure 21:
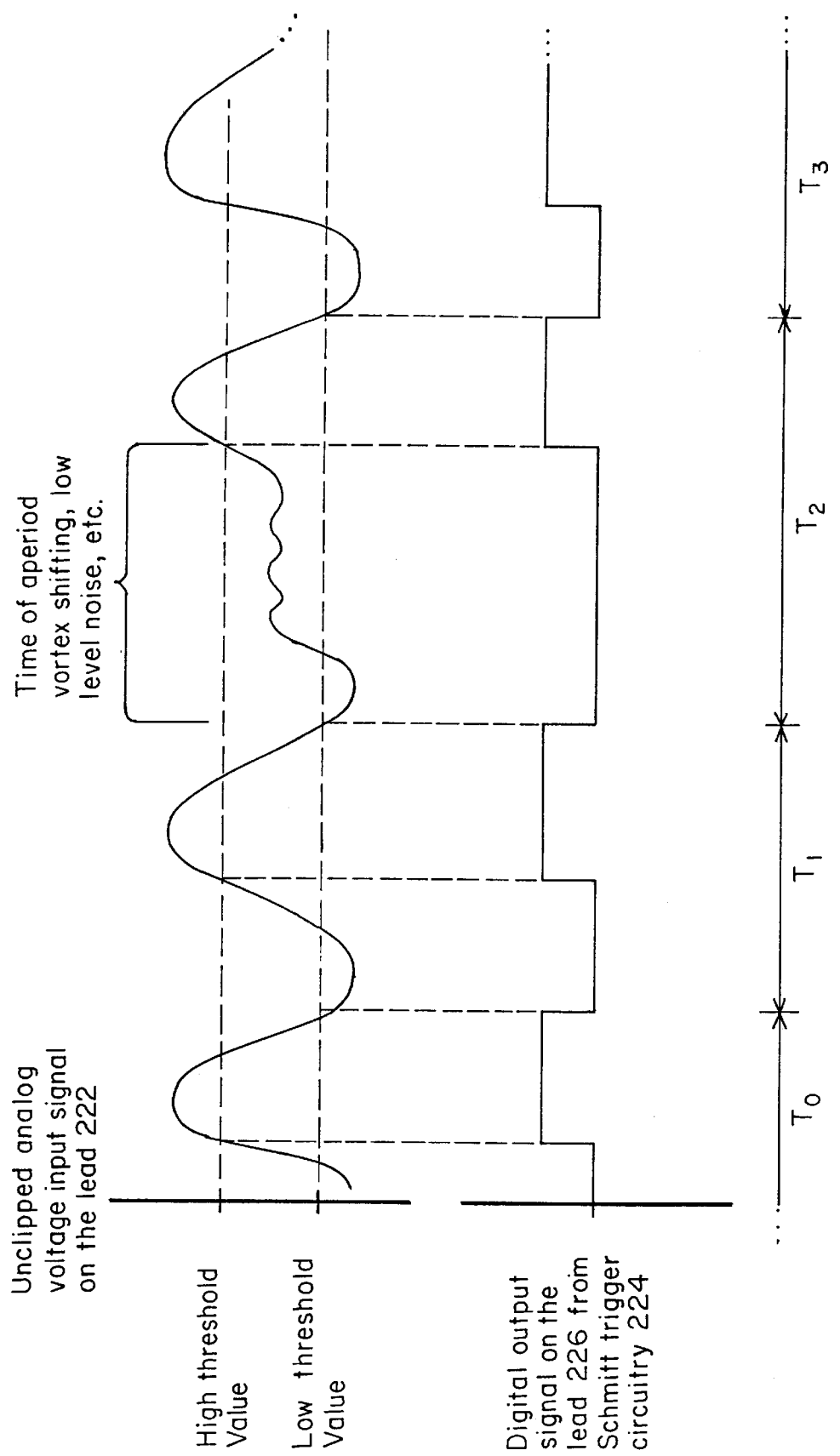
FIG. 21 is a graph of the analog input voltage signal to the Schmitt trigger circuitry of FIG. 19 and the digital voltage signal output of the Schmitt trigger circuitry of FIG. 19.

As previously discussed above, the microprocessor 208 determines and updates the flow rate or velocity of the fluid 56 approximately ten times per second. The process for computing the velocity of the fluid 56 is as follows. First the microprocessor 208 creates a timings array containing an N number of time interval values determined from the digital voltage signal on the lead 226. The time interval values are measured from successive and consecutive trailing edges of the digital voltage signal on the lead 226, as shown in FIG. 21. As can be seen in FIG. 21, the interval value $T_2$ is longer than the interval value $T_1$. After the first N consecutive interval values are determined, the array acts as a first-in-first-out buffer so that the oldest timing value currently stored in the array is removed from the array each time a new timing value is stored to the array. After N interval values are stored in the array and after each new interval value is stored in the array, the interval values in the array are used to compute the frequency of the vortex street according to the following rules:

If all of the interval values $T_{1 \ldots N}$ stored in the array are greater than five hundred milliseconds (500 ms), the microprocessor 208 sets the output frequency of the vortex street to zero (0), thereby causing the instantaneous computed flow rate (velocity) $F_i$ of the fluid 56 to be ste to zero (0).

If all of the interval values $T_{1 \ldots N}$ stored in the array are less than or equal to five hundred milliseconds (500 ms), the microprocessor 208 determines if:

$$d_{min} \leq \frac{T_{max} - T_{min}}{T_{max} + T_{min}} \leq d_{max} \tag{1}$$

where $T_{min}$ is the minimum time interval value currently stored in the array, $T_{max}$ is the maximum time interval value currently stored in the array, $d_{min}$ is the minimum deviation limit specified by the user, and $d_{max}$ is the maximum deviation limit previously lpecified by the user. If equation (1) is not satisfied for the current time interval values stored in the array, the microprocessor 208 does not update the frequency of the vortex street and, therefore, does not change the instantaneous computed velocity $F_i$ of the fluid 56 from the previously determined instantaneous velocity of the fluid 56. If equation (1) is satisfied for the current time interval values stored in the array, the microprocessor computed the estimated frequency of the cortex street ($f_{vs}$) by the following equation:

$$f_{vs} = \frac{1}{\frac{1}{N}\sum_{i=1}^{N} T_i} \quad (2)$$

After the frequency $f_{vs}$ is computed according to equation (2), the flow rate or velocity (in feet per second) of the fluid is determined by dividing the frequency $f_{vs}$ (in cycles per second or hertz) by the K-factor $K_f$ (in cycles per foot) which provides a correction factor that is needed due to the non-linear relationship between the velocity of the fluid 56 and the frequency $f_{vs}$ of the vortices 90 that exists at low velocities of the fluid 56. The relationship is given by:

$$\text{Fluid Velocity} = \frac{f_{vs}}{K_f} \quad (3)$$

As an example, if the frequency $f_{vs}$ is fifteen hertz (15 Hz) and the K-factor $K_f$ at that frequency is 10.5, the instantaneous velocity $F_i$ of the fluid 56 is 15/10.5=1.429 feet per second. The K-factor $K_f$ is a function of the frequency $f_{vs}$ and $K_f$ equals twelve when $f_{vs}$ equals three hertz, $K_f$ equals eleven when $f_{vs}$ equals nine hertz, $K_f$=9.9 when $f_{vs}$ equals eigthty-four hertz, and $K_f$=9.8 when $f_{vs}$ equals 175 hertz. At frequencies $f_{vs}$ below three hertz and above 175 hertz, the K-factor $K_f$ is extrapolated from the given values. At frequencies between three hertz and 175 hertz, the K-factor $K_f$ is interpolated from the two given points (one higher and one lower). For example, if $f_{vs}$ equals eight hertz, the K-factor $K_f$ is interpolated by the K-factor values given for $f_{vs}$ equals three hertz and $f_{vs}$ equals nine hertz. The given values for $f_{vs}$, $d_{min}$, $d_{max}$, and $K_f$ are constants preprogrammed by the user and are dependent on the diameter of the pipe sections 43, 45 and the insertion depth of the vortcx sensor assembly 52. For purposes of explanation, but not limitation, of the vortex shedding flow meter 40, N can be five (5), $d_{max}$ can be 0.15, and d can be 0.01. The diameter of the pipe sections 43, 45 can range between three inches to a theoretical limit of infinity.

Figure 20:
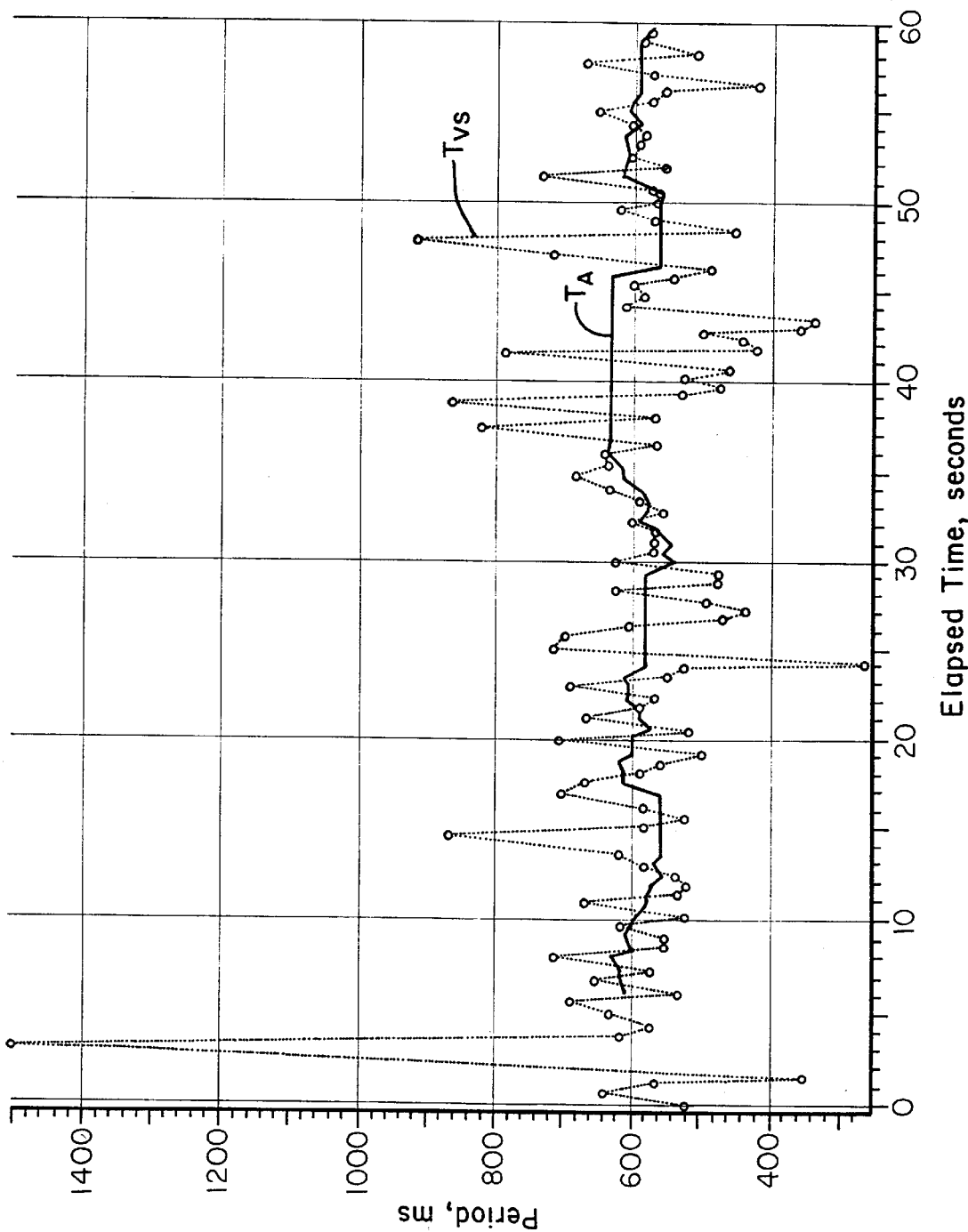
FIG. 20 is a graph of the fluctuating period $T_{vs}$ of the digital output voltage signal from the Schmitt trigger circuitry of FIG. 19 and the averaged period $T_A$ of the digital output voltage signal from the Schmitt trigger circuitry of FIG. 19.

The results of the "averaging" portion of the algorithm used in the microprocessor 208 are best seen in FIG. 20, wherein the fluctuating period $T_{vs}$ ($T_{vs}=1/f_{vs}$) of the digital voltage signal on the lead 226 and the "averaged" period $T_A$ are compared. The $T_A$ curve does not vary as much as the $T_{vs}$ curve because it significantly reduces the short term effect of the fluctuations in the curve $T_A$.

Figure 22:
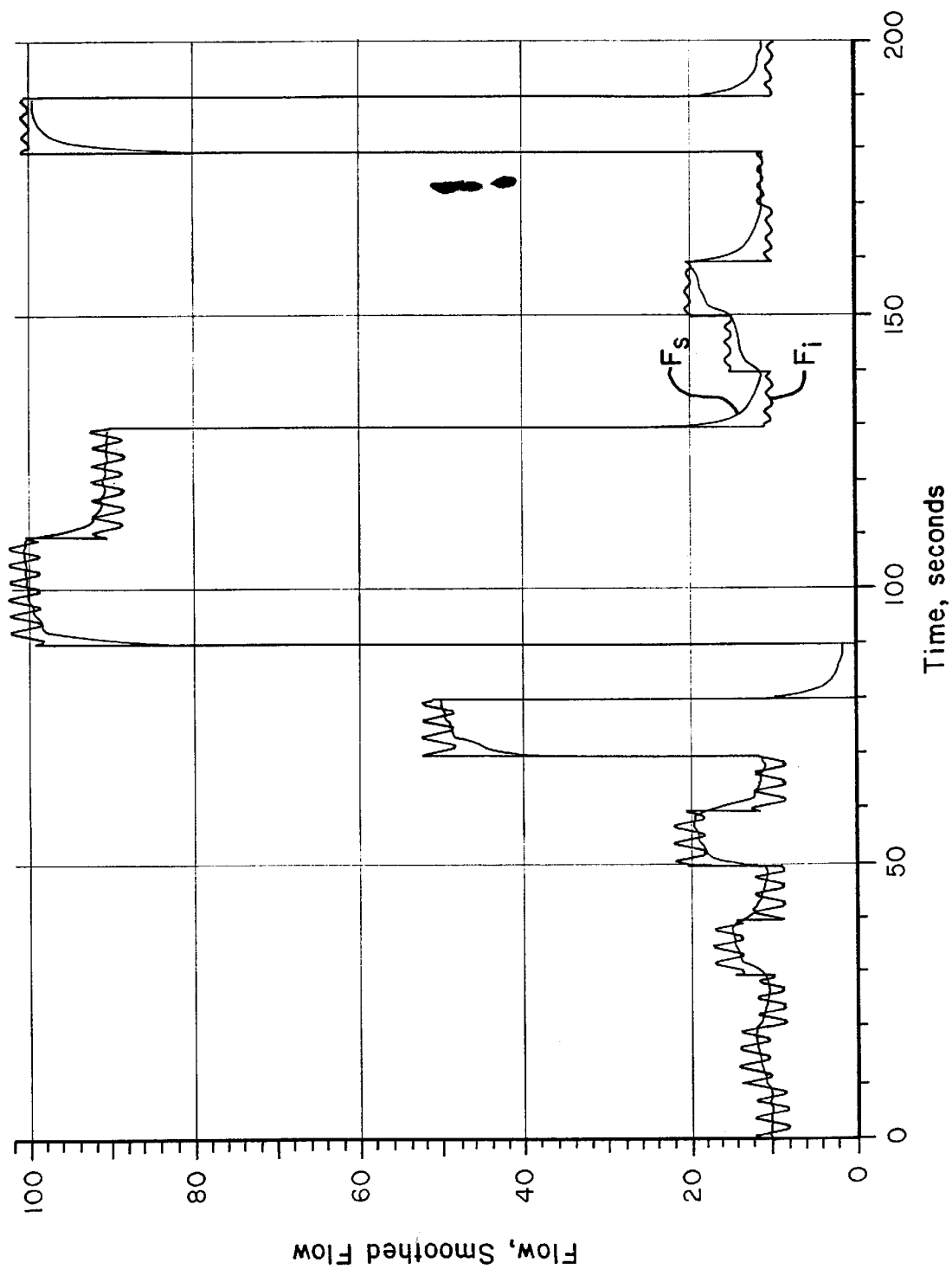
FIG. 22 is a graph of the computed flow rate (velocity) $F_C$ of the fluid flowing through a vortex shedding flow meter and the smoothed flow rate (velocity) $F_s$ of the fluid flowing through a vortex shedding flow meter according to this invention.

The second part of the algorithm performed by the microprocessor is the "'smoothing" function which further reduces the effect of fluctuations in the frequency of the vortex street. As best seen in FIG. 22, the instantaneous flow rate or velocity $F_i$ of the fluid 56 as determined from the "averaging" portion of the algorithm can still contain many local extrema (local minimum and maximum points) during small time intervals. Therefore, the vortex shedding flow meter 40 preferably smooths the curve $F_i$ to create the curve $F_s$. While many smoothing algorithms may work, it is preferable that the microprocessor 208 be able to respond quickly to large changes in flow rate of the fluid 56 while effectively filtering out small fluctuations in the flow rate of the fluid 56 that are common under steady state flow conditions of the fluid 56.

The preferred second part of the algorithm in the microprocessor 208 works as follows, Every one-tenth of a second, the instantaneous flow rate (velocity) $F_i$ of the fluid 56 is detemined according to the "averaging" part of the algorithm discussed previously above. After the instantaneous flow rate or velocity $F_i$ of the fluid 56 is deteined, a smoothed flow rate or velocity $F_s$ is determined according to the following iterative equation:

$$F_s = F_i K_{sf} + F_{s-1}(1-K_{sf}) \quad (4)$$

where $F_{s-1}$ is the smooth flow rate calculated during the previous time interval and $K_{sf}$ is the variable smoothing factor. It should be noted that smoothing factor $K_{sf}$ is not the same thing as the K-factor K used in equation (3) above. The smoothing factor $K_{sf}$ is given by the following two relationships:

$$0 < K_{sf} \le 1 \quad (5)$$

$$K_{sf} = 1 - e^{\frac{-t_{cyc}}{T}} \quad (6)$$

where $t_{cyc}$ is the calculation cycle tlime and is preferably equal to one-tenth of a second (since the flow rate of the fluid is calculated tell times per second) and T is the dynamic time constant and is equal to:

$$T = \text{absolute value of} \left( \frac{1}{F_i - F_{s-1}} \right) \quad (7)$$

As shown by equations (4)–(7), the smoothed flow rate $F_s$ of the fluid 56 is partially dependent on the previously computed smoother flow rate $F_{s-1}$ and is partially dependent on the varying smoothing factor $K_{sf}$. The smoother curve of the flow rate $F_s$ that results from operation of the "smoothing" portion of the algorithm on the computed curve of the flow rate $F_i$ responds quickly to large changes in the computed curve $F_i$ while minimizing small changes in the computed curve $F_i$.

As a final check before the new smoothed flow rate $F_s$ is used to update the previously computed smooth flow rate $F_s$, the amplitude of the analog voltage siganal oil the selected lead 206, 216, 220 is used to verify that the electric voltage signal currently generated by the strain gauge transducers 102, 104 represents the presence of a vortex 90 acting on the vane 84, as previously discussed above. If the electric voltage signal cuLrrently generated by the strain gauge transducers 102, 104 represents the presence of a vortex 90 acting on the vane 84, the newly computed smoothed flow rate $F_s$ replaces the previously computed smoother flow rate $F_{s-1}$. If the electric voltage signal culrently generated by the strain gauge transducers 102, 104 does not represent the presence of a vortex 90 acting on the vane 84, the smoothed flow rate is not updated and the previously computed smoothed flow rate $F_{s-1}$ continues as the measured flow rate (velocity) of the fluid 56 flowing through the flow passage 60.

The values for the $f_0$, $C_i$, $d_{min}$, $d_{max}$, N, and the other variables and constants used in the algorithm described above can be stored in the nonvolatile memory 240 that is connected to the microprocessor 208 via the leads 242, 244 which act as a conventional electric serial bus connecting the microprocessor 208 and the nonvolatile memory 240. In addition, the nonvolatile memory 240 can also store information such as the diameter of the pipe sections 43, 45, the insertion depth of the vortex sensor assembly 52 within the pipe sections 43, 45, the density of the fluid 56 flowing through the pipe segments 43, 45, and any other necessary information.

Once the microprocessor 208 begins to calculate the smoother flow rate (velocity) $F_s$ of the fluid 56, it is possible for the microprocessor to output the flow rate information $F_s$ in a variety of ways. First, the microprocessor 208 can be connected via the serial bus defined by the leads 242, 244 to the analog output display module 246 so that the analog output display module 246 can be provided with a digital signal representing the smoothed flow rate $F_s$ and so that the analog output display module 246 provides an analog voltage signal on the leads 248, 250 that is linearly related to the smoothed flow rate $F_s$. An AD421 Digital-to-Analog Converter manufactured by Analog Devices of California, can be used as the analog output display module 246, thereby causing the analog output module 246 to provide an industry standard 4–20 milliamp two wire interface with foul (4) milliamps representing the condition of zero (0) flow rate (velocity) of the fluid 56 through the now passage 60 and twenty (20) millialps representing full scale flow of the fluid 56 through the flow passage 60. The serial bus defined by the leads 242, 244 can also be connected to the optional display 251 which can be an LCD display that provides a digital readout of the digital output signal fronm the microprocessor 208 on the leads 242, 244 representingo the smoothed flow rate or velocity $F_s$ of the fluid 56.

As an alternative to usinIg the analog output display module 246, pulse output module 252 can be connected to the microprocessor 208 via the lead 254. the microprocessor 208 can be programmed to supply a digital voltage signal on the lead 254 that has a frequency related to the smoothed flow rate $F_s$ of the fluid 56. The pulse output module 252 can then supply an pulsed electric signal on the leads 248, 250 that are related to the frequency on the lead 254 and, therefore, that is related to the smooth flow rate (velocity) $F_s$ of the fluid 56. In a typical application, the pulse output module 252 will create a signal on the leads 248, 250 consisting of pulsed electric shorts between the leads 248, 250 for approximately five milliseconds at a frequency of less than 100 hertz that repersents the flow rate or flow volume of the fluid 56 or the vortex signal frequency.

The leads 248, 250 are connected to the power supply circuitry 255, which provides power to all of the electrical components of the vortex shedding flow meter 40. The power supply circuitry 255 can include a battery (not shown) and/or connections to external electric power sources (not shown). In addition, the leds 248, 250 provide electrical connection to the external field wiring which provide a means for the user of the vortex shedding flow meter 40 to supply information to the microprocessor 208 via the communications interface 256.

The communication interface 256 is connected to the microprocessor 208 via the leads 258, 260 and is used to allow the user of the vortex shedding flow meter 40 to input information on the leads 248, 250 from a configuration device (not shown). In addition, the communications interface 256 can include a user friendly visual display (not shown) that allows the user to be prompted for information and a user-friendly keyboard or numeric pad (not shown) to allow the user to respond to prompts for information. When the vortex shedding flow meter 40 is first powered on, the output from the analog output module 246 and the pulse output module 252 are disabled for a short period of time, for example, two seconds. The configurlation device (not shown) connected to the two leads 248, 250 can then transmit information to the microprocessor 208 via the communication interface 256 and, alternatively or in conjunction with communication from the configuration device to the microprocessor 208, the tiser can enter information directly through the communication interface 256. The ability of the user to input information into the microprocessor 208 is particularly important when calibrating a specific vortex shedding flow meter 40. More specifically, the operational characteristics of manufactured vortex shedding flow meters 40 may vary. In addition, the insertion depth of the vortex shedding flow meter 40, the diameter of the pipe sections 43, 45, the density of the fluid 56, and other characteristics of the environment in which the vortex shedding low mieter 40 is placed may require that the vortex shedding flow meter 40 be calibrated for specific cases. The ability of the usci to transmit information to the microprocessor 208 and the non-volatile memory 240 via the communication interface 256 and the leads 248, 250 allows the user to calibrate the vortex shedding flow meter 40 and to update information stored in the vortex shedding flow meter 40.

As previously discussed above, the construction of the vane 84 and its area of reduced thickness 112 from a flexible material havingu a low modulus of elasticity provides a unique advantage in that the deflection of the vane 84 about the area of reduced thickness 112 is increased in direct proportion to the decrease in the modulus of elasticity of the material. Therefore, a vortex shedding flow meter 40 according to the present invention wherein the vane 84 is made friom a glass-filled polycarbonatc material having an average modulus of elasticity of about $1 \times 10^6$ p.s.i., (i.e., about thirty times less than that of stainless steel) can produce a thirty-fold increase in the deflection of the vane 84 and a correspondingu thirty-fold increase in signal-to-noisc ratio for a fluid 56 that has a weak vortex. The area of reduced thickness 112 accommodates further increases in deflection of the vane 84 in response to the passing vortices and provides more strain for detection by the strain gauge transducers 102, 104, thereby mechanically preamplifying, the vibrations of the vane 84 for enhanced tranisduction of mechanical motion to electric signals. Thus, the combination of the increased deflection of the vane 84 and the mechanical preamplification resulting from the area of reduced thickness 112 in combination with the low modulus of elasticity of the vane 84 enables the vortex shedding, flow meter 40 of the present invention to detect vortices 90 that are too wealk to be detected by most other existing vortex shedding flow meters. The low modulus of elasticity of the vane 84 is particularly important since increases the vibration amplitude of the vane 84 at low energy levels, thereby making the vortex shedding flow meter suitable for use for measuring fluids or liquids having low flow rates or that generate weak vortices.

For purposes of this invention, a vane 84 and area of reduced thickness 112 made from a material with a modulus of elasticity preferably in the range of $1.0 \times 10^5$ to $1.5 \times 10^6$ p.s.i. or as much as $5 \times 10^6$ p.s.i. produces sufficiently enhanced signal-to-noiose ratios for detecting vortex frequencies shed by bluff bodies or vortex genciators 74 in flowing gases and other low density fluids in flow measurement applications. A variety of elastomers, resins, plastics, and ABS materials are available with these suitable characteristics. However, superior results have been obtained with materials having a modulus of elasticity generally in the range of about $0.5 \times 10^6$ p.s.i. and specifically with a glass-filled polycarbonate with a modulus of elasticity of about $1.0 \times 10^6$ p.s.i., as described above.

The foregoing description is considered as illustrative only of the principles of the invention. Furtheiore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow. For example, while the previous discussions have described the vortex sensor assembly 52 and the flow passage 60 as being generally centered within the pipe segments 43, 35 and the flow meter body 50, the vortex sensor assembly 52 can be positioned so that it and the flow passage 60 are not centered within the pipe segments 43, 45 or the flow mieter body 50. The insertion depth of the vortex sensor assembly 52 is defined as the distance from the top wall of the pipe or flow meter body 50 to the longitudinal centel line of the shroud 26. The position of the vortex sensor assembly 52 within the pipe segments 43, 45 and the flow meter body 50 can be taken into account and accommodated during the calibration of the vortex sensing flow meter 40, and each pipe size will have a separate algorithm determined empirically for that pipe size or for the flow meter body designed for that pipe size.

The embodiments of the invention in which an exclusive property or privilege is claimed are defined as follows:

1. A method of processing analog electric signals produced by a vortex detector in response to vortices acting of the detector, comprising the steps of:

amplifying and filtering the analog electric aignals from the vortex detector to provide stronger analog signals from the vortex detector that are indicative of strength and frequencies of vortices acting on the vortex detector;

producing digital signals from the analog signals such that the digital signals are indicative of frequencies and individual vortex periods;

measuring and comparing amplitude of the amplified analog electric signals to a threshold value; and treating digital signals as having been produced by the cortex detecdtor in response to vortices acting on the vortex detector only when the amplitude of the amplified analog signals from which the digital signals are produced are higher than the threshold.

2. The method of claim 1, including the step of determining vortex frequency from the digital signals that are treated as having been produced by the vortex detector in response to vortices acting on the vortex detector.

3. The method of claim 2, including the step of determining an average vortex frequency $f_{vs}$ from the digital signals that are treated as having been produced by the vortex detector in response to vortices acting on the vortex detector over a time interval.

4. The method of claim 3, including the steps of measuring an individual vortex period for each vortex signal in said time interval that is treated as having been produced by said vortex detector in response to a vortex acting on the vortex detector, summing all of said individual vortex periods over said time interval, dividing the sum by the number of said vortex periods in the time interval to get an averagye vortex period for the time interval, and determining an average vortex frequency $f_{vs}$ for the time interval as a reciprocal of the average vortex period for the time interval.

5. Thec method of claim 4, including the step of detemining said average vortex frequency $f_{vs}$ as:

$$f_{vs} = \frac{1}{\frac{1}{N}\sum_{i=1}^{N} T_i}$$

where $T_i$ is an individual vortex period and N is the number of individual vortex periods $T_i$ in the time interval.

6. The method of claim 5, including the step of updating average vortex frequency $f_{vs}$ to include a most recent average vortex frequency $f_{vs}$ only when all of the individual vortex periods $T_i$ in the time interval for which said most recent average vortex frequency $f_{vs}$ is determined are within an allowable deviation range.

7. The method of claim 6, including the steps of determining both a longest vortex period $T_{max}$ and a shortest vortex period $T_{min}$ in the time interval and determining that said most recent average frequency $f_{vs}$ is within the allowable deviation when $$d_{min} \leq \frac{T_{max} - T_{min}}{T_{max} + T_{min}} \leq d_{max} \qquad (1)$$

where $d_{min}$ is a minimum deviation limit and $d_{max}$ is a maximum deviation limit.

8. The metood of claim 7, including the step of utilizing the most recent average vortex frequency $f_{vs}$ to determine an instantaneous flow rate $F_i$ of the stream fo flowing fluid according to a relationship $$F_i = \frac{f_{vs}}{k_f}$$

where $K_f$ is a variable correction factor in cycles per foot that conforms the instantaneous flow rate $F_i$ to a non-linear relationship between fluid velocities and vortex frequencies in low velocity fluid flows.

9. The mothod of claim 8, including the step of determining a smooth flow rate $F_s$ according to an equation $$F_s = F_i K_{sf} + F_{s-1}(1-K_{sf}),$$

where $F_{s-1}$ is a previously determined smoothed flow rate from a previous time interval and $K_{sf}$ is a smoothing factor.

10. The method of claim 9, including the step of determining the smoothing factor $K_{sf}$ in a range of $0 < K_{sf} \leq 1$ according to an equation $$K_{sf} = 1 - e^{\frac{-t_{cyc}}{T}}$$

where $t_{cyc}$ is a cycle time between starts of successive smoothed flow rate $F_s$ calculations and T is a dynamic time constant detemined by $$T = \text{absolute value of}\left(\frac{1}{F_i - F_{s-1}}\right)$$

* * * * *